United States Patent [19]

Harris

[11] Patent Number: 5,488,392
[45] Date of Patent: Jan. 30, 1996

[54] PRECISION, ABSOLUTE MAPPING COMPUTER POINTING DEVICE AND VERSATILE ACCESSORIES

[76] Inventor: Thomas S. Harris, 10863 W. Fuller Pl., Baton Rouge, La. 70816

[21] Appl. No.: 234,841

[22] Filed: Apr. 28, 1994

[51] Int. Cl.$^6$ ..................................................... G09G 3/02
[52] U.S. Cl. .......................................... 345/157; 345/168
[58] Field of Search ...................................... 345/156, 157, 345/160, 161, 163, 168, 167; 74/471 XY

[56] References Cited

U.S. PATENT DOCUMENTS

| | | | |
|---|---|---|---|
| 4,670,743 | 6/1987 | Zemke | 345/157 |
| 4,692,756 | 9/1987 | Clark | 345/157 |
| 4,782,327 | 11/1988 | Kley et al. | 341/2 |
| 4,786,768 | 11/1988 | Langewis et al. | 345/168 |
| 4,896,554 | 1/1990 | Culver | 74/471 XY |
| 4,935,728 | 6/1990 | Kley | 345/161 |
| 4,945,357 | 7/1990 | Tal | 345/161 |
| 5,086,296 | 2/1992 | Clark | 345/157 |
| 5,126,723 | 6/1992 | Long et al. | 345/157 |
| 5,164,712 | 11/1992 | Niitsuma | 345/168 |
| 5,171,978 | 12/1992 | Mimlitch et al. | 345/167 |
| 5,252,952 | 10/1993 | Frank et al. | 345/157 |
| 5,287,121 | 2/1994 | Louis et al. | 345/156 |
| 5,293,158 | of/1994 | Soma | 345/161 |

OTHER PUBLICATIONS

Logitech CyberMan 3D Controller operating model package bearing model #1004 and copyright date of 1993.

*Primary Examiner*—Curtis Kuntz
*Assistant Examiner*—Vivian W. Chang

[57] ABSTRACT

A computer pointing device having a rectangular operation plate and an integrated stationary base is disclosed. The operation plate is maneuverable with substantially equal ease along any pathway within a finite X-Y plane defined by the base. Movement of the operation plate involves an intermediate carriage that is uniaxially movable in unity with the operation plate along a first axis. The operation plate is uniaxially movable relative to the carriage along a second axis that is perpendicular to the first axis. Uniaxial movement is guided by ball bearings positioned between face-to-face counterpart support and guide channels respectively composed on the base and on the carriage, parallel to the first axis. Similar channels are composed between the operation plate and the carriage, parallel to the second axis. The ball bearings, being partially engaged in each face-to-face counterpart channel, permit relative movement that is parallel to the channels and inhibit play or lateral movement between counterpart channels. In some embodiments, two rotary encoders are mounted in the carriage such that each of the encoder shafts is positioned perpendicular to one of the movement axes and each being in frictional contact with a linear rack. One rack is fixed to the base perpendicular to the first axis and drives one shaft from below, the shaft being perpendicular to the first axis. The other rack is fixed relative to the operation plate parallel to the second axis and drives the other shaft from above, the shaft being perpendicular to the second axis. The encoders each respond to independent uniaxial movement and are driven by consistent contact with the racks, thereby generating consistent signals enabling the maintenance of absolute mapping relationships. Since the ball bearings enforce precision alignment and orientation of moving parts with an absence of play, small encoder shafts are used, whereby possible resolution is over twice that obtainable in prior art devices having ball-driven encoders.

19 Claims, 12 Drawing Sheets

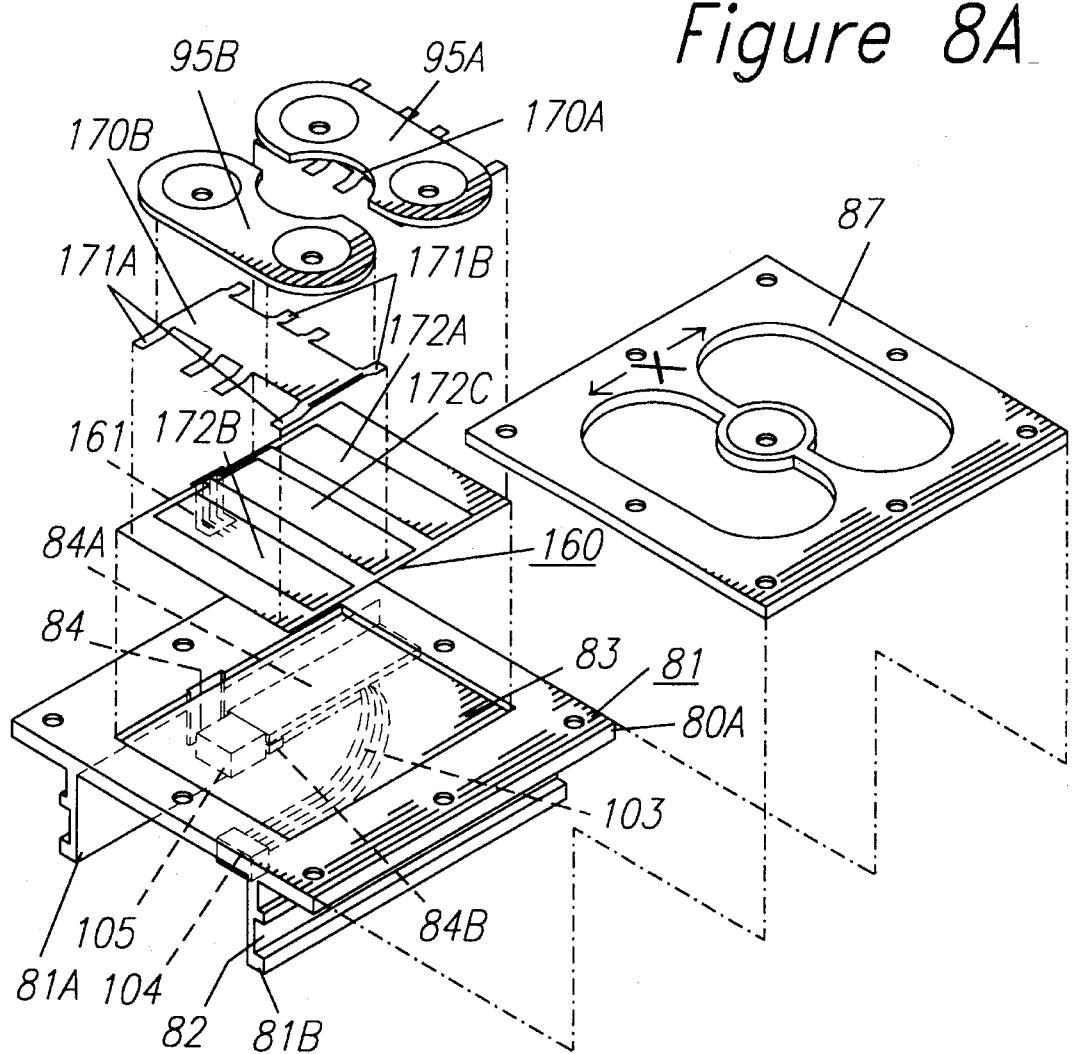

PRECISION, ABSOLUTE MAPPING COMPUTER POINTING DEVICE AND VERSATILE ACCESSORIES

I. BACKGROUND OF THE INVENTION

This invention generally relates to pointing devices and signal generating devices suitable for manipulating objects on the display screen of a computer, and more particularly to a pointing device with improved precision and absolute mapping capabilities.

II. DESCRIPTION OF PRIOR ART

Rapid developments in the computer industry in recent years have resulted in personal computer systems that are increasingly affordable and easier to use, not requiring individuals to have prior training in the use of computers. Ease of use has been facilitated by arrival of computer systems that are graphics oriented. These systems display objects on their screens, including familiar icons and cursors. This enables one to simply position the cursor upon other objects by using a pointing device, and to depress a button on the pointing device to select objects corresponding to processes formerly requiring word oriented commands to be learned and to be entered by means of a keyboard.

Many recent software programs, including operating environments and systems, support and are recommended to be used with pointing devices. Some software even requires the use of a pointing device for full functionality.

The importance of pointing devices for commanding computer operation has resulted in proliferation of various types of devices designated for this purpose. However, these devices vary in this capacity in many ways relative to an idealized pointing device. Since positioning and dragging a marking tool over surfaces, including slate and notepads, are inherent parts of early developed human dexterity, industry studies insist as ideal a pointing device whose pointing element or pointer is moved over its working area analogously to the manner in which a writing or marking instrument is moved over the object to be marked upon such as a notepad. Further, any movement of the pointer, however slight or complex, is detected and mapped to the computer's display screen.

1. Absolute Positioning Devices

Devices such as digitizers are considered as the electronic equivalents of pens and notepads, and in this regard are the most ideal of pointing devices. The digitizer consists of an electronic tablet or pad and has a pen-like stylus or a puck as the pointer whose position on the pad is mapped to the cursor.

Due to the high resolution, normally well over 400 dots per centimeter (1000 dots/inch) and the absolute positioning capabilities, the digitizer is most commonly used to input precise spatial data such as complex map delineations, and less as a pointing device because of many disadvantages. The digitizer requires a working surface substantially larger than those required for other prior art devices and is much more expensive to purchase. The digitizer is also more difficult to set up for use, requires special software and much more electrical current to operate than other prior art devices. These disadvantages are considered major, particularly in consideration for use with battery powered, portable computer systems.

Some computers have been built with the capacity to be operated by manipulation of a stylus over the screen and to depend substantially upon the stylus for input, where the stylus functions as the pointer. Some computers so endowed also have provisions for using other types of external pointing devices, thus, acknowledging limitations of this methodology for certain applications. Since the entire screen area functions as the active working area, a relatively large screen demands extensive stylus movement. Other pointing devices use a relatively small active working area corresponding to any screen size.

Stylus operated devices have other major inconveniences; the stylus having to be grasped to achieve any functionality and un-tethered styli being easily misplaced or even lost.

2. Devices Using Rotatable Balls

Despite the advantages of digitizers, devices that use rotatable balls are currently the most common of all types of prior art pointing devices. Of this type, the mouse is the most common, because it is relatively simple to manufacture and quite intuitive to use. The pointing element of the mouse is the entire palm-sized housing, and which is moved over a flat surface to maneuver the cursor over the computer's display. A ball in the housing rolls as the device is moved, and which causes rotary encoders to rotate and transmit electrical signals causing the cursor to move. One or more select buttons are mounted directly on the mouse, facilitating simultaneous cursor control and button operation.

A major shortcoming of the mouse is that it is much less maneuverable than a pen or pencil, as the entire palm-sized housing must be gripped with two or more fingers, and requires essentially the whole hand and parts of the arm to be involved. Frequent operation of mouse devices over long sessions has been cited to cause muscular fatigue and associated long-term physical disorders. Another deficiency of the mouse is that its mechanical parts allow free play in order to operate smoothly. This, combined with practical limits involved in transferring rotational motion from a ball to cylindrical shafts, particularly at points of contact near the ball's axis of rotation, limit the mouse's ability to consistently track and indicate its own movements. Thus, the mouse can indicate only approximate relative movement and is unable to maintain an absolute map of its position to the screen cursor. Another disadvantage of the mouse is that it demands a special pad or other flat, firm working surface. This surface demand is considerably larger than that required by all other prior art pointing devices except digitizers.

Trackballs are also currently in wide usage because trackballs are essentially mouse devices with the ball positioned to face upward, thus, being simple to manufacture. The trackball improves over the mouse in some ways, particularly in being more compact; and being capable of integration into portable computers to eliminate setup and work space requirements, and for convenient use. With the trackball, the ball is actually the pointer and is fixed within a one-piece integrated unit and not requiring a particular surface or pad upon which to operate. One operates the trackball by rotating the ball directly with one or more fingers in the direction of desired cursor movement. Direct operation of the device by a ball has several disadvantages. One, movement of the hand over a spherical surface does not correspond intuitively with common skills involved in moving a pen over a flat notepad. Two, the trackball normally must be moved in repeated strokes to obtain long cursor transitions. Three, since it is not possible to attach select buttons directly to the ball, simultaneous operation of the buttons and the ball for executing drag maneuvers is awkward. Problems associated with the mouse's mechanism are also present in trackballs.

The resolution of ball operated devices is typically about 120 to 160 movement counts per centimeter (about 300 to 400 counts/inch) and considered adequate since they are limited more by maneuverability than by sensitivity.

3. Devices Using Toggles

Joysticks represent a different class of prior art pointing devices, and like trackballs, are integrated units not requiring a special working surface and can be manufactured as an integral part of a computer. The pointer may consist of a pen-like toggle or one or more buttons which are pivoted or pressed in the direction of intended cursor movement; and which must remain in the position until the cursor reaches the desired destination or waypoint. Since incremental movement of the pointer varies the cursor's speed rather than the distance the cursor is moved, these devices can neither support nor respond precisely to quick, complex movements that are natural to pointing and particularly to writing and drawing.

4. Sliding-Knob Operated Devices

Zemke in U.S. Pat. No. 4,670,743 (1987), Clark in U.S. Pat. No. 4,692,756 (1987), Frank and Murmann in U.S. Pat. No. 5,252,952 (1993) and Soma in U.S. Pat. No. 5,293,158 (1994) disclose pointing devices that are operated with a knob, and are designed to be an integral part of a computer or keyboard. The knobs are slidable within a field corresponding to the screen and generally operate analogously to a pen on a pad. These devices have two linear encoders for detecting transitional movement relative to the two axes in the X-Y plane. Other than the digitizer, these are the only types of prior art devices found that have the capacity to map their pointer's position to the screen cursor, and to permit the cursor's location to be anticipated by noting where the pointer is positioned, and vice versa. However, unlike digitizers, these sliding-knob operated devices do not determine the absolute position of the knob within the active area, but are rather accurate in maintaining absolute mapping by relative positioning based on initial conditions. A major deficiency in these prior art devices is related to resolution limitations imposed by linear encoders, which is as low as 40 movement counts per centimeter (about 100 counts/inch), combined with the fact that they have a finite operating field or active working area. These factors can potentially lead to unreachable boundary situations where the knob reaches one of its limits of movement before to the cursor reaches the corresponding border of the screen. Zemke and Clark, both, devised rather complex hardware and firmware means to eliminate this problem. A major factor limiting the potential of these devices is that their moving parts slide against stationary parts. Thus, they lack facility for maintaining low friction movement, particularly along diagonal pathways, while simultaneously enabling precise tracking. Friction is reduced by allowing free play in the movement mechanism, thus sacrificing precision. Logitech Incorporated (1993) uses sliding knob means and linear encoders in the CyberMan (TM) 3D controller, and similar shortcomings including this sacrifice are evident. The Cyberman has a resolution of only 100 movement counts per centimeter (250 counts/inch), and still uses hardware and firmware means to prevent unreachable boundary situations.

5. Rotatable-Slidable Cylinder Operated Devices

Devices that use rotatable, slidable cylinders or rollers represent another prior art approach to improve pointing devices. Devices disclosed by Culver in U.S. Pat. No. 4,896,554 (1990), by Niitsuma in U.S. Pat. No. 5,164,712 (1992) and by Long, Ramachadran and Quek in U.S. Pat. No. 5,126,723 (1992) are also designed to be manufactured into the computer as an integral part. A cylinder is used as the pointer, and is located parallel to and near the space bar of the keyboard for convenient use. The cylinder is rotated axially or slid laterally to operate encoders that send signals to cause the cursor to move along Y and X axes, respectively. In addition to a lack of pen and notepad correspondence, some of these devices are complex, containing most of the circuitry of a mouse, plus many additional parts. Like the sliding-knob operated devices described above, some of these devices use additional hardware switches and firmware to prevent potential unreachable boundary situations along the X-axis where the cylinder slides in a restricted field.

III. SUMMARY OF THE INVENTION

It is therefore an object of this invention to provide a computer pointing device or signal generating device based on a movement mechanism that supports uniplanar-omnidirectional movement of a rectangular operation plate as the pointing element and which is contained in a unit that has an integral stationary base, thus, being usable upon any reasonable support. The pointing device also has select buttons mounted directly on the operation plate, facilitating simultaneous operation of the buttons while pointing maneuvers are being executed.

The movement mechanism of the pointing device is central to the invention and the key to other objects and advantages; and includes an intermediate carriage that is movably mounted between the operation plate and the stationary base, and a pointer to which the operation plate is mounted. The carriage is uniaxially movable parallel to a first axis of the rectangular base and moves only in unity with the operation plate, where the pointer is movably mounted to the carriage and is uniaxially movable relative to the carriage along an axis parallel to the second axis of the base. The pointer is movable along any pathway and to any point in a plane defined by the two perpendicular axes of finite length corresponding to the dimensions of the rectangular base. Multidirectional movement of the pointer is the resultant of the two simultaneous components of relative movement in the mechanism, the first occurring between the base and the carriage, and the second occurring between the carriage and the pointer.

Movement is essentially friction-free, the pointer and attached operation plate being movable with equal ease in all directions, where the operation plate is essentially as maneuverable as a pen or pencil on a notepad. The operation plate may be moved directly with one or more fingers or indirectly with a pen or pencil engaged upon the surfaces thereof. In one embodiment, a receptacle is provided to mount a pen or pencil readily positioned for use therein. Additionally, large scale embodiments can be adapted for operation by the feet, or for special needs of handicapped individuals.

The mechanism of the pointing device supports the use of rotary encoder detection means, where the encoder shafts are driven by smooth racks mounted on certain members of the mechanism between which uniaxial movement occurs relative to the member on which each rotary encoder is mounted. The encoder-driving racks maintain absolute perpendicular orientation to the rotational axes of the encoder shafts, and maintain consistent frictional contact with the shafts. This permits the driven diameter of the encoder shafts to be reduced to less than one-half that of ball-driven shafts, which results in a resolution increase of over twofold that obtainable from prior art devices with ball-driven rotary encoders.

The high resolution, and the absolute frictional contact between the encoder-driving racks and the rotary encoder shafts enable the generation of consistent positioning data and the capacity to maintain a substantially absolute map of the operation plate's position to the cursor's position. Unlike prior art devices that have bound pointers combined with linear encoders, the much higher resolution of the pointing device of the present invention causes the production of an abundance of movement counts which ensure that the cursor is movable to each boundary of the computer's display without the need for additional hardware or firmware. Additionally, the electrical components and circuitry used are common to that of prior art ball-operated devices. Thus, existing industry compatible mouse device driver software is used, where the software count per pixel ratio is set to ensure smooth cursor movement over the entire area of the screen, despite the operation plate being bound within the confines of the integral base. Further, the abundance of counts enables more highly defined cursor movement on high resolution video systems than that allowed by prior art ball-driven devices because a greater number of counts determine each increment of cursor movement.

Uniaxial movement between various members of the movement mechanism is facilitated by ball bearing guided mounts that include two U-shaped counterpart channels oriented parallel to the axis of movement, where one counterpart channel is formed in each of the members involved in relative movement. The two counterpart channels are aligned face-to-face and are frictionally separated by a plurality of ball bearings that engage into each of the counterpart channels, allowing relative movement only along the longitudinal axes of the channels. One each of these ball bearing guided mounts is composed between the carriage and the base on each end, mounting the carriage to the base, and being oriented along the axis of carriage movement. A second set of the ball bearing guided mounts is composed between the upper part of the carriage and underneath the pointer on each side, mounting the pointer to the carriage, and being oriented perpendicular to the first set of mounts. In some embodiments, the U-shaped channels are oriented side-by-side where the ball bearings being bracketed from the sides also inhibit displacement between the channels in the Z-axis direction. Thus, the ball bearings have the additional function to hold the pointer, carriage and base together as a unit.

Three embodiments of the pointing device of the present invention are described; a basic embodiment that is simplest to understand and to manufacture, a first alternative embodiment that has parts arranged to be made more compact and to exhibit other alternative arrangements for a number of features, and a second alternative embodiment that has parts arranged to accommodate miniaturization and features facilitating integration into the housing of a portable computer or keyboard and to be used effectively therein.

Additionally, inventive accessory devices are described that attach to the pointing device to enhance versatility for meeting various needs. These include a flexible dust cover, a tracing device, a brake device, a pen-like control knob device and a mouse-like control knob device.

Further objects and advantages of the present invention will become apparent from a consideration of the drawings and ensuing descriptions.

IV. BRIEF DESCRIPTION OF THE DRAWINGS

IV-A. DRAWINGS

A better understanding of the invention can be obtained when the descriptions of the embodiments and accessories are considered in conjunction with the following drawings, in which:

FIG. 8A is an exploded right-rear perspective view of the pointer assembly of the first alternative embodiment shown in FIGS. 2 and 8;

FIG. 9A is a fragmentary section of the view of FIG. 9, showing an alternative arrangement of track assemblies.

FIG. 10A is a fragmentary section of the view of FIG. 10, showing an alternative arrangement of track assemblies.

Figure 12A:
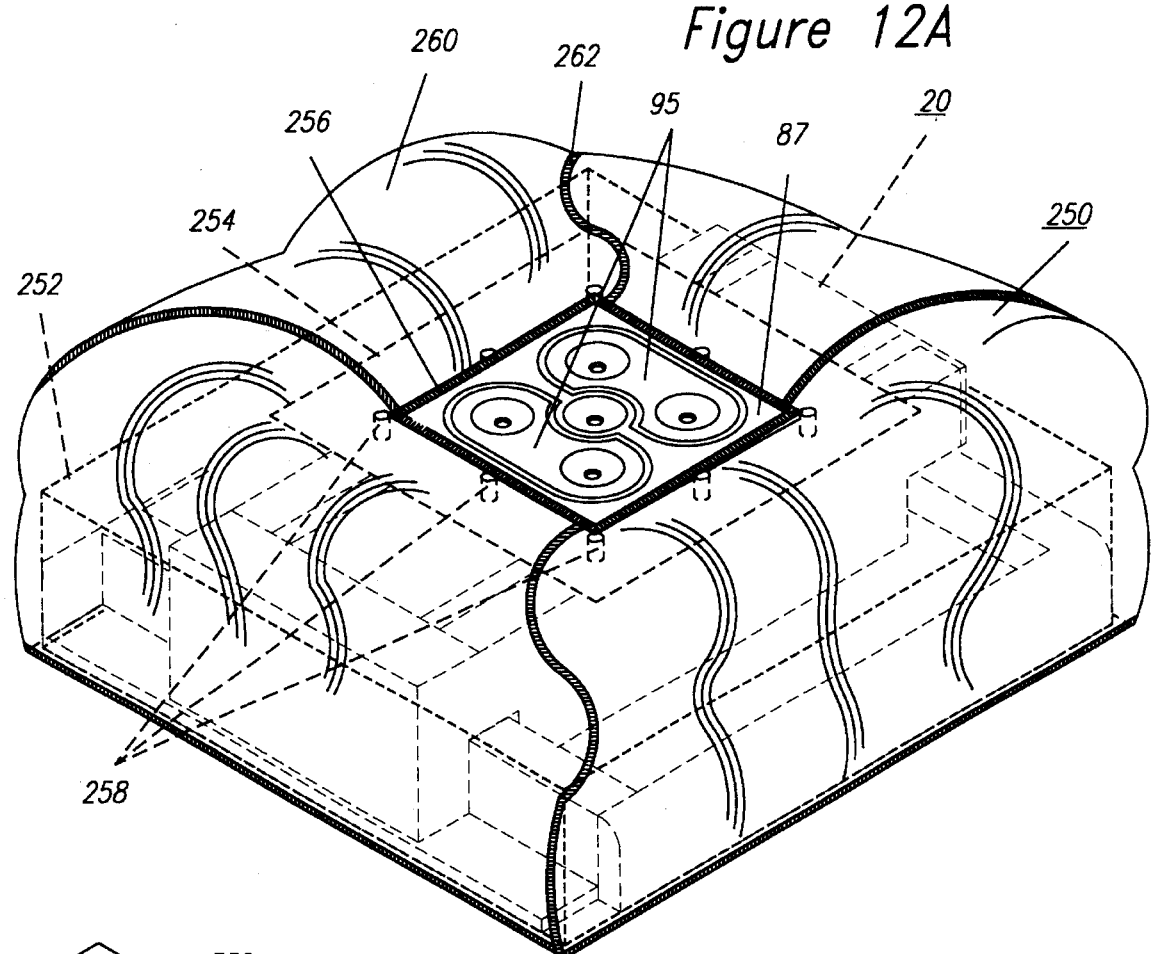
FIG. 12A is a left-front perspective view of the first alternative embodiment shown in FIG. 2, fitted with an accessory flexible dust cover of the present invention.
Figure 12B:
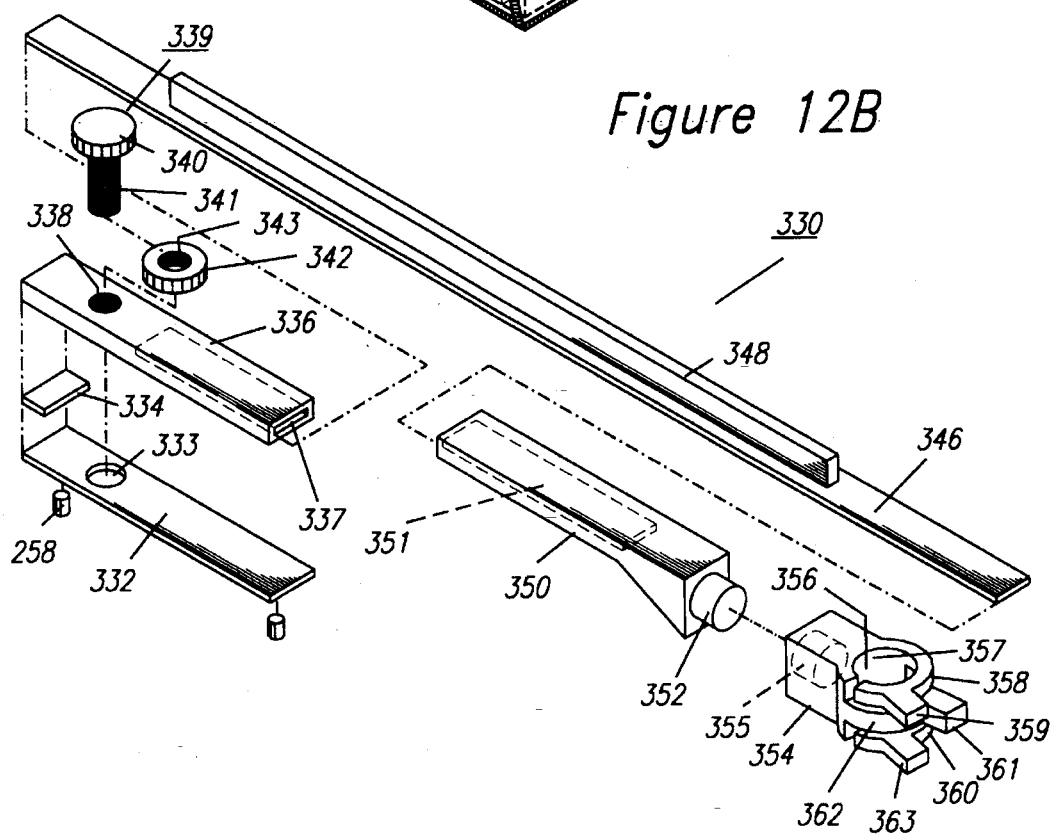
FIG. 12B is an exploded perspective view of an accessory tracing attachment device of the present invention.
Figure 12D:
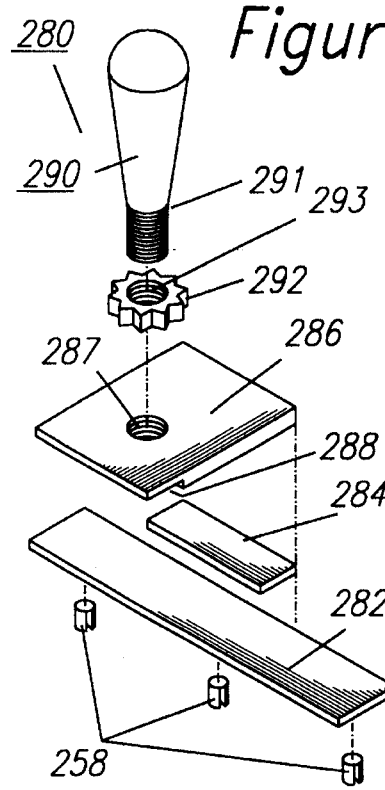
FIG. 12D is an exploded perspective view of an accessory pen-like operation knob attachment device of the present invention.
Figure 12C:
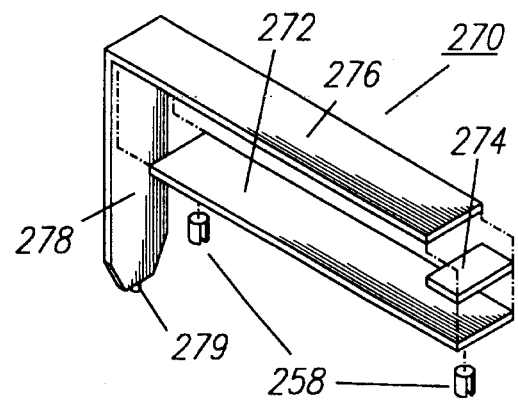
FIG. 12C is an exploded right-rear perspective view of an accessory brake attachment device of the present invention.
Figure 12E:
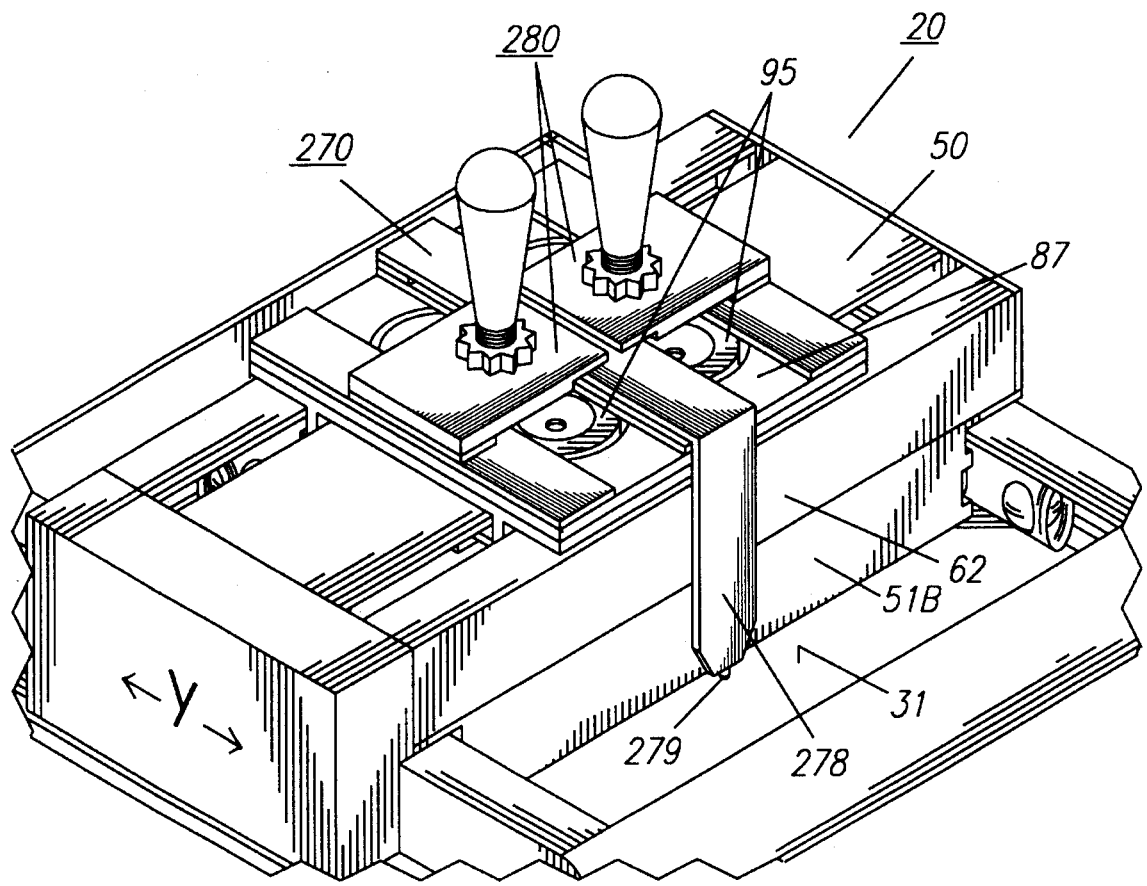
FIG. 12E is a partial left-front perspective view of the first alternative embodiment shown in FIGS. 2, 8 and 8A, with two of the accessory pen-like operation knob attachment devices shown in FIG. 12D and the accessory brake attachment device shown in FIG. 12C fitted for use.
Figure 12F:
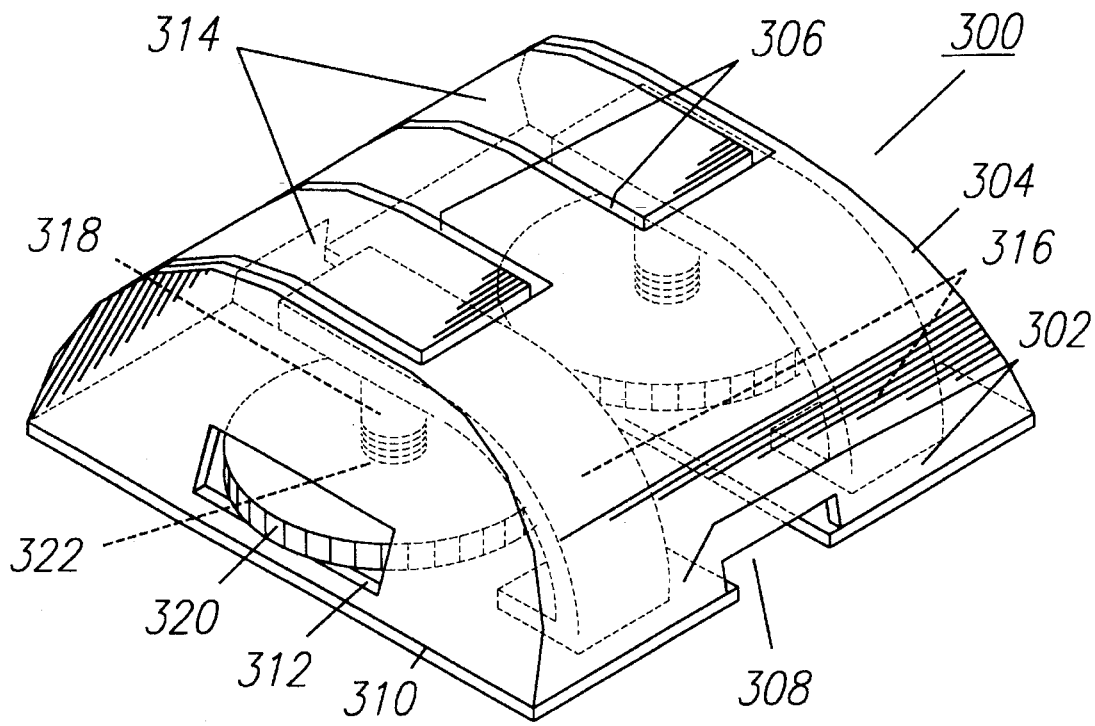
Figure 12G:
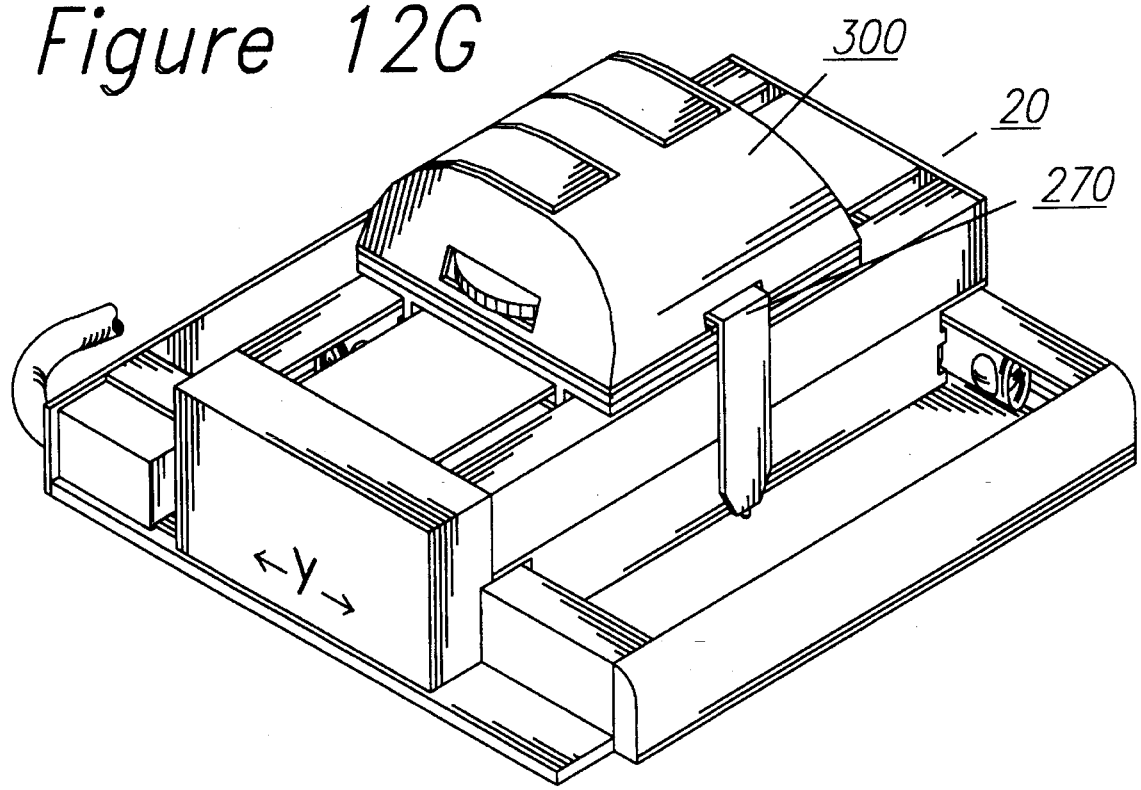

FIG. 12F is a left-front perspective view of an accessory mouse-like operation knob attachment device of the present invention; and FIG. 12G is a left-front perspective view of the first alternative embodiment shown in FIGS. 2, 8, 8A, and 12E, with the accessory mouse-like operation knob attachment device shown in FIG. 12F and the accessory brake attachment device shown in FIGS. 12C and 12E fitted for use.

IV-B. REFERENCE NUMBERS IN DRAWINGS

Herein, many reference numbers are used to describe the pointing device of the present invention because it differs greatly from prior art pointing devices, requiring not only different parts, but numerous details concerning their shape and arrangement to be given in order for one to readily understand the structure and operation of the invention. Additionally, since three embodiments and five attachable accessory devices are included, the number of parts and reference numbers are further increased. Therefore, Table 1 is provided as a convenient legend of reference numbers and corresponding part names to point out these details and how the arrangement and shape of some parts differ among the three embodiments.

V. DETAILED DESCRIPTION OF THE DRAWINGS

V-A. A BASIC EMBODIMENT

The fundamental structure and operational characteristics of the pointing device of the present invention can be attained from the immediately ensuing descriptions of a basic embodiment. Alternative and specialized features are later described in association with a first and a second alternative embodiment, and accessory attachment devices.

VA-1. Overview of a Basic Embodiment—FIGS. 1, 5, 6 & 7

Figure 1:
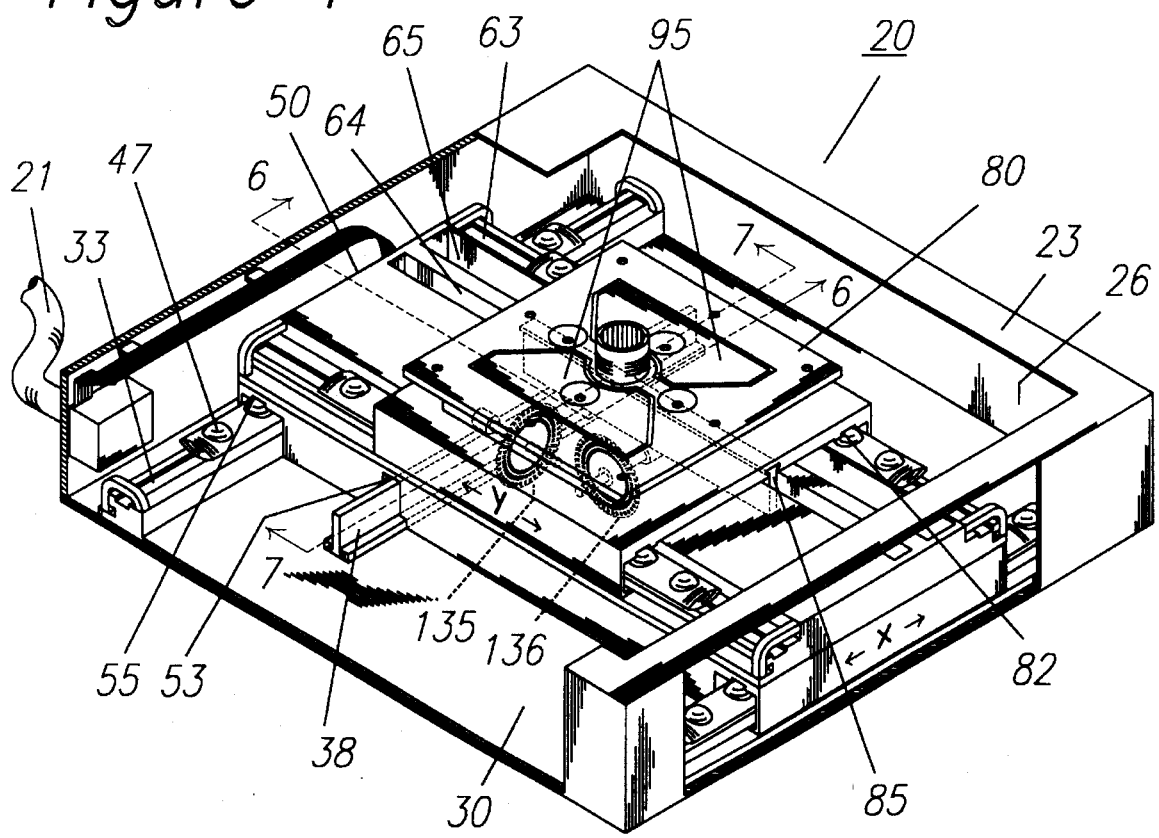
FIG. 1 is a left-front perspective view of a basic embodiment of the pointing device of the present invention, with viewing sections cut away from the front, top and right side of the outer case.

An overview of the basic embodiment of the invention is shown in FIG. 1. Different views of various details are given in FIGS. 5, 6 and 7. The pointing device 20 comprises three major assemblies, a base 30, a carriage 50 and a pointer 80. Pointing device 20 further includes rotary encoder disk assemblies 135 and 136, ball bearing guide means 47, a connecting cable 21 and an outer case 23 (shown in FIG. 1 with sections cut away from the front, top and left side to expose parts enclosed therein). In practice, the cable 21 (shown in part), is extended and fitted with a suitable terminal means for connection to an appropriate port of a device such as a computer A shown in FIG. 3.

VA-1a. Overview of Stationary Members of the Basic Embodiment

The base 30 and the outer case 23 are fixed together by suitable means (not shown) and are placed upon or attached to a desk or other reasonable support to remain stationary during operation of the pointing device 20. The case 23, having a rectangular access opening 26 in the top section, allows the user to access the pointer assembly 80, which is the pointing element, and the select buttons 95 that function the same as those on a conventional two-button mouse.

VA-1b. Overview of the Movement Mechanism of the Basic Embodiment

Movement of the pointer 80 relative to the stationary base 30 involves the intermediate carriage 50 that houses electrical components, including encoder disk assemblies 135 and 136. The pointer 80 is movable along the X-axis conjointly with the carriage 50, the carriage 50 being movable upon the base 30 along the X-axis and is inhibited by guide mount means of any movement along the Y-axis. The pointer 80 is separately movable upon the carriage 50 only along the Y-axis and is inhibited by guide mount means of any movement along the X-axis relative to the carriage 50. Diagonal movement is facilitated by relative movement between the pointer 80 and the carriage 50 along the Y-axis, simultaneously with relative movement along the X-axis, occurring between the carriage 50 and the base 30.

VA-1c. Overview of the Guide Mount Means of the Basic Embodiment

Precision guide mount means controls the movement of the carriage 50 along the X-axis relative to the base 30 and comprises an upward facing U-shaped support channel 33 formed upon the base 30 near the front and rear ends, parallel to the X-axis, and a similar downward facing channel 55 formed underneath the carriage 50 near each end, directly above the corresponding support channel 33 and held frictionally separated and aligned by the ball bearings 47. Each ball bearing 47 being engaged in the support channels 33 below and in the guide channels 55 above, interlock the channels with respect to the lateral axes. Thus, the ball bearings 47 roll upon the edges of channels 33 and beneath the edges of channels 55 along the X-axis, and being interlocked by the ball bearings 47, the channels 33 and 55 are restrained of any relative movement that is perpendicular to their longitudinal axes.

Similar to X-axis movement, Y-axis movement is guided by precision means composed between the pointer 80 and the carriage 50, comprising upward facing support channels 63 formed on the top of the carriage 50 at each side, parallel to the Y-axis, and companion downward facing guide channels 82 formed underneath the pointer 80 on each side. Companion guide channels 82 are aligned directly above each companion support channel 63, and are engaged by ball bearings 47 similar to the means previously described for channels 33 and 55, thus, enabling the pointer 80 to be moved along the Y-axis and restraining any relative movement along the X-axis between the pointer 80 and the carriage 50.

VA-1d. Overview of the Movement Detection Means of the Basic Embodiment

Means to track movement of the pointer 80 comprises the two rotary encoder disk assemblies 135 and 136 that are driven by racks 38 and 85. The rack 38 is fixed to the base 30, parallel to the X-axis, and is in frictional contact with encoder disk assembly 135 through an access slot 53 formed in the bottom of the carriage 50. The encoder disk assembly 135 is mounted within the carriage 50 such that it is rotated by the rack 38 during movement of the carriage 50 along the X-axis, thereby causing the generation of signals indicative of the amount and direction that the carriage 50 is moved.

Similarly, the rack 85 is fixed to the pointer 80, but is parallel to the Y-axis and is in frictional contact with encoder disk assembly 136 through an access slot 64 formed in the top of the carriage 50. The encoder disk assembly 136 is positioned to be rotated by the rack 85 as the pointer 80 is moved along the Y-axis, thereby causing the generation of signals indicative of the amount and direction that the pointer 80 is moved relative to the Y-axis.

VA-1e. Overview of the Operational Features of the Basic Embodiment

All user applied movement is applied to the pointer 80 which is movable along any path in the X-Y plane. The ball bearings 47 allow relative movement to occur between mutually engaged channels (33 with 55, and 63 with 82) with minimal friction in response to even diagonal forces that are nearly perpendicular to the axis of movement. Thus, any movement of the pointer 80 requires substantially equal force whether applied for orthogonal or diagonal movement. The X-axis and Y-axis components of any movement occur between different parts and permit the encoder disk assemblies 135 and 136 to operate independently.

The encoder operation racks 38 and 85 maintain a strict perpendicular attitude to and a consistent area of contact with encoder disk assemblies 135 and 136, respectively. This provides the capacity to consistently rotate encoder shafts having much smaller driven diameters than those in prior art devices; thus, being capable of much higher resolutions. It is emphasized that the movement mechanism briefly described above provides not only low friction operation of the pointer 80 in all directions, but that ball bearings 47 being partially engaged between associated channels 33 and 55, and between associated channels 63 and 82 prevent any free play in the mechanism. These major factors provide the essential basis for the precise maneuverability, improved resolution, absolute mapping capabilities and other advantages over prior art devices that will be apparent in the ensuing detailed descriptions.

VA-2. Details of Structure and Operation of the Basic Embodiment

Figure 5:
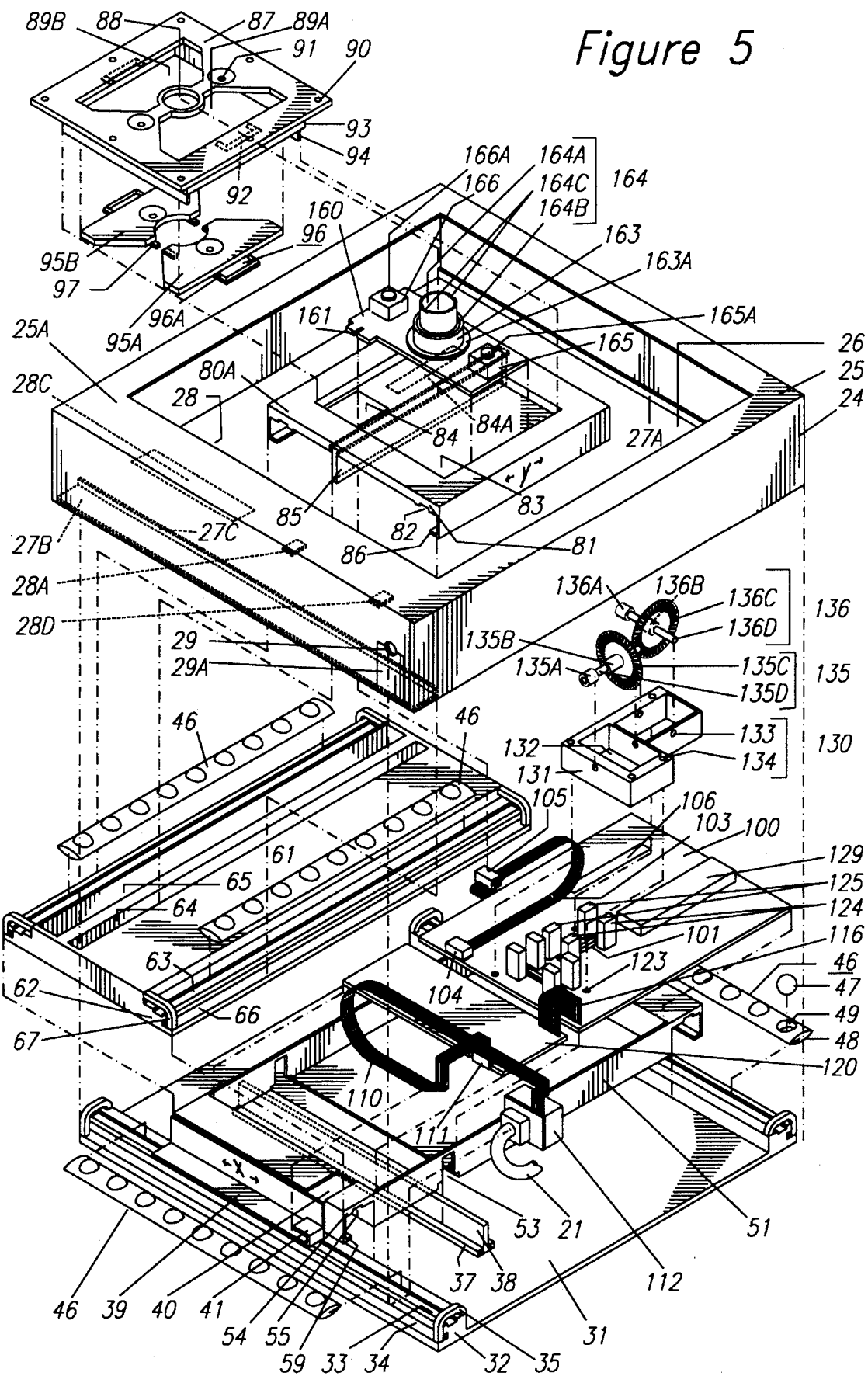
FIG. 5 is an exploded left-rear perspective view of the basic embodiment shown in FIG. 1.
Figure 6:
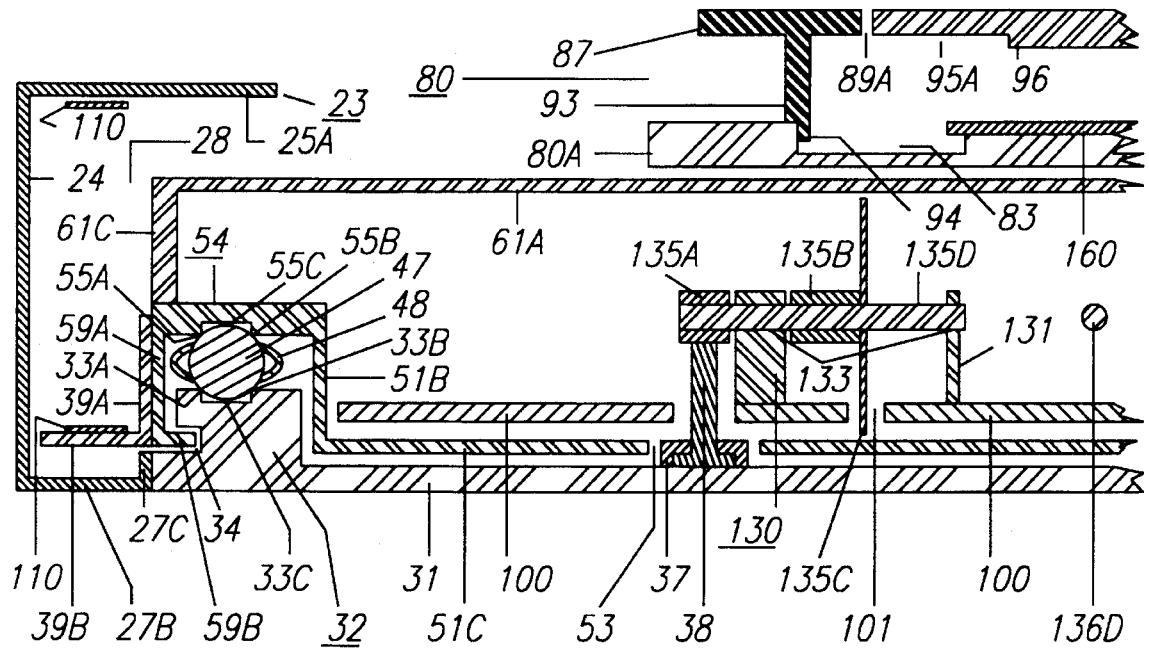
FIG. 6 is a partial longitudinal section view of the basic embodiment shown in FIG. 1, taken along the section line 6—6.
Figure 7:
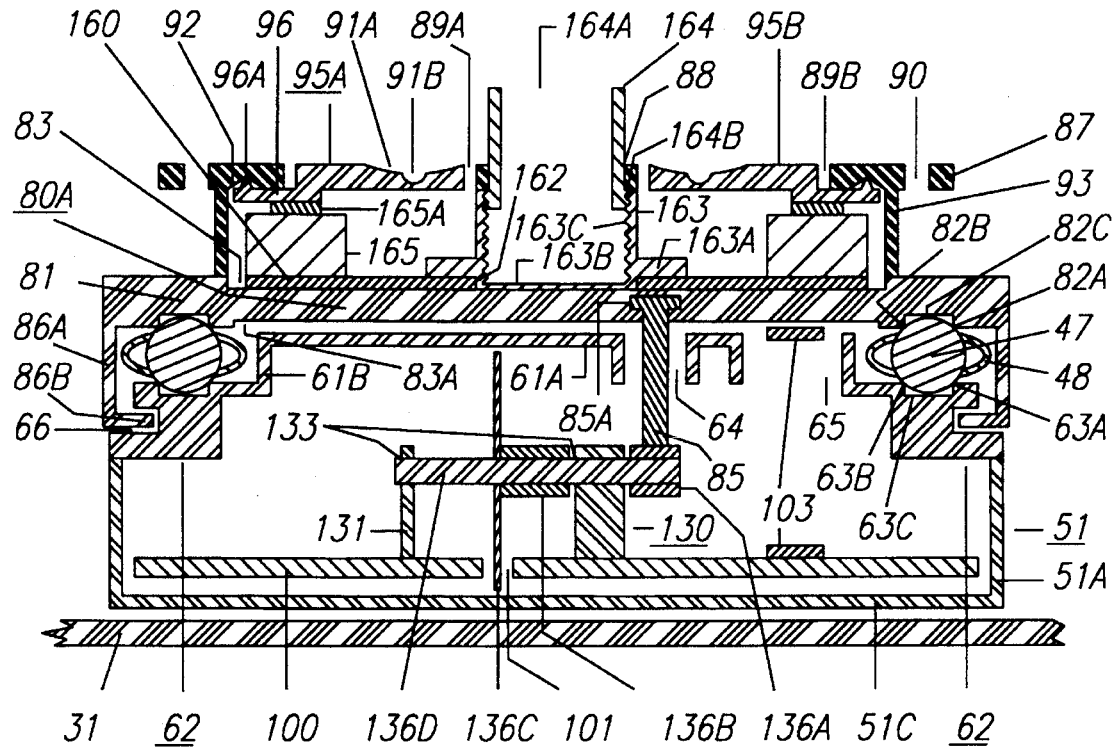
FIG. 7 is a partial lateral section view of the basic embodiment shown in FIG. 1, taken along the section line 7—7.

The structural and operational overview of the basic embodiment of the pointing device 20 described immediately above along with FIG. 1 will now be expanded in detailed descriptions of FIGS. 5, 6 and 7.

VA-2a. The Outer Case of the Basic Embodiment—FIG. 5

FIG. 5 shows that the outer case 23 includes the perimeter wall 24, that is perpendicular to a top section flange 25 along the front, left and right sections of the wall 24 together with a cable well cover 25A serving as a substantially wider top section flange at the rear. The top surface flanges 25 and 25A partially enclose the top, leaving a rectangular access opening 26 to enable operation of the pointer 80 and select buttons 95 within the case, and are convenient surfaces upon which to steady fingers or other parts of the hand not required to directly operate the pointing device 20. The case 23 also includes front and rear mounting spacer bars 27A and 27C. The rear spacer bar 27C is positioned inside and offset from the rear section of wall 24 by a cable well floor 27B to which it is joined. The cable well floor 27B partially encloses the underside of the case 23 near the rear section of the wall 24. The outer case 23 further includes an external cable access hole 29 in the rear section of wall 24 near the left extremity. The hole 29 is rectangular, and extends from the bottom upward to the center of the wall 24 along the Z-axis, then terminating as a semicircle. An access door 29A is fixed to enclose the rectangular portion of the hole 29, and having a semicircular notch at its top extremity results in a circular opening on the rear section of wall 24 to receive cable converter 112 and connecting cable 21.

The case 23 is constructed of a hard plastic and is fitted over the base 30, which is also plastic. The base 30 is attached within the opening in the bottom of case 23, defined by the left and right sections of wall 24 and the spacer bars 27A and 27C. Spacer bars 27A and 27C maintain a clearance between the case 23 and the enclosed movable parts. A cable well cavity 28 is provided in the case 23 near the rear section of the wall 24 between the cable well cover 25A and floor 27B. A flexible cable 110 moves within this cavity during operation of the device as later described.

VA-2b. The Stationary Support Base of the Basic Embodiment—FIGS. 5 & 6

FIG. 5 shows that the base assembly 30 comprises a thin, flat plate 31 having two support track assemblies 32 formed parallel to each other, one along the front edge and the other along the rear edge of plate 31, projecting upward. The base plate 31 is substantially square, typically 8 to 14 centimeters (3¼ to 5½ inches) along each side, but may be well over 30 centimeters (12 inches). The tracks 32 span the entire width of plate 31 along the X-axis, and are substantially rectangular in cross section with the U-shaped support channel 33 formed on the upper surface and a rectangular groove 34 formed in the outer side surfaces (best shown in FIG. 6). A track bumper cap 35 is fixed to each end of each track 32 to arrest movement of the carriage 50 and to absorb minor impact forces when carriage 50 reaches the ends of the tracks 32. Alternatively, caps 35 can be mounted on the inside of the left and right sections of the wall 24 of the case 23 to be aligned at the ends of the tracks 32.

The base 30 further includes a mounting rail 37 that accommodates the inverted T-shaped encoder operating rack 38. The rail 37 is formed upon plate 31 between and parallel to the pair of tracks 32. The rail 37 is a pair of inverted L-shaped members facing each other at a distance to hold the rack 38 snugly against plate 31 (FIG. 6). The mounting rail 37 and rack 38 are equal in length and are sufficiently long to allow the rack 38 to remain in contact with a roller 135A of the encoder disk assembly 135 throughout its range of movement along the X-axis within the carriage 50. Composed of a rubber material, the rack 38 maintains a direct upward attitude and is sufficiently resilient to provide adequate frictional contact against the roller 135A with negligible upward force. Alternatively, the rigid mounting rail can project further into the slot 53, allowing the rack 38 to have a much shorter reach and to be made more flexible.

VA-2c. The Carriage Assembly of the Basic Embodiment—FIG. 5

Shown in an exploded view in FIG. 5, the carriage assembly 50 comprises a body assembly 51 and a top cover assembly 61 to form a rectangular enclosure for housing and positioning various internal parts, including a main circuit board 100, an encoder support block 130, the encoder disk assemblies 135 and 136, and an optional supplementary circuit board 120. The circuit board 100 and the supplementary circuit board 120 are connected to components outside the carriage 50 by a switch connecting cable 103 and the main flexible connecting cable 110. Both body 51 and cover 61 are composed of a hard plastic material.

The carriage 50 provides all relative X-axis movement of the pointing device 20, and supports the Y-axis movement of the pointer 80. The overall width of the carriage 50 along the X-axis is typically one-half the width of the base 30. The movement of carriage 50 is confined within the span of tracks 32. Therefore, carriage 50 can be moved over a maximum range in the X direction that typically equals one-half the width of the base 30. Specifically, the X-stroke or X dimension of the active area of the pointing device 20 approximately equals the width of the base 30 along the X-axis, minus the width of the carriage 50. Similarly, the Y-stroke or Y dimension of the active area approximately equals the length of the carriage 50 along the Y-axis, minus the length of the pointer 80 along the Y-axis. These dimensions are reduced by amounts allotted to bumper caps 35 and 67 located at the ends of tracks 32 and 62, respectively. The active area is the field in the X-Y plane over which the pointer 50 can be moved and correspondingly represents the area of a display screen of a computer.

VA-2c(1). The Carriage Body of the Basic Embodiment—FIGS. 6 & 7

FIGS. 6 and 7 show that the carriage body assembly 51 has a rectangular center section defined by two side walls 51A, two end walls 51B and a floor 51C. A guide track assembly 54 and a retainer rail assembly 59 are formed at each end wall 51B at the front and rear ends of the body 51. The tops of the walls 51A and 51B extend vertically to the centerline of shafts 135D and 136D, which are parts of encoder disk assemblies 135 and 136. The encoder shaft access slot 53 is formed through the lower extremity of the body 51 parallel to the X-axis, and dissects the floor 51C, extending into each side wall 51A, forming inverted-T shaped openings therein (FIG. 5). The slot 53 has dimensions to accommodate the rack 38 mounted in the rail 37 with a clearance to avoid frictional contact with the stationary rack 38 and the mount 37.

VA-2c(1) (a). Guide Mount Means of the Basic Embodiment—FIG. 6

Guide track assemblies 54 are formed at the top of each end wall 51B at the front and rear of the carriage body 51. Each guide track 54 projects perpendicularly from the respective end wall 51B outward to be positioned above and parallel to each track 32. One U-shaped guide channel 55 is formed in each track 54 and each is positioned as a mirror image in cross section to each support channel 33 upon the base 30. FIG. 6 shows tracks 32 and 54, having channels 33 and 55, respectively, positioned below and above the ball bearings 47. The ball bearings 47 are centered upon the edges 33A and 33B of the U-shaped support channel 33, and do not contact the channel bottom 33C. Similarly, the ball bearings 47 are centered below edges 55A and 55B of the guide channel 55 and are not in contact with the inverted channel bottom 55C. This arrangement enforces strict linear alignment of the channels and prevent any movement or play to occur laterally.

The widths of the channels 33 and 55 are equal and are approximately 1.414 times the radius of the ball bearings (2 times sine of 45 degrees times the radius). Thus, ball bearings having a radius of approximately 2.38 millimeters (3/32 inches) require a channel width of approximately 3.37 millimeters (1/8 inches). These relationships also allow easy movement of the carriage 80 even in response to diagonal forces that are nearly perpendicular to the axis of movement. Further, these dimensional relationships allow the four channel edges involved to contact the balls cross sectional circumferences at equal intervals and maintain sufficient interlock of the two channels 33 and 55. These also allow vertical clearances between the tracks 32 and 54 to be sufficient for free movement of the ball bearing retainer sleeves 48. The depth of channels 33 and 55 is at least approximately 0.30 times the radius of the balls (1 minus the sine of 45 degrees times the radius), thus requiring a depth of approximately 0.7 millimeters (about 1/40 inches) for balls having a radius of 2.38 millimeters to avoid frictional contact between the ball bearings 47 and the channel bottoms 33C and 55C.

VA-2c(1) (b). Carriage Retainer Means of the Basic Embodiment

FIG. 6 shows one of the retainer rail assemblies 59 in the L-shaped profile, comprising a side plate 59A formed perpendicular to a retainer flange 59B. Plate 59A is formed perpendicular to the outer extremes of track 54 and extends vertically downward terminating at the flange 59B. The flanges 59B project laterally into retainer grooves 34 on each side to hold carriage 50 in place during transport of the pointing device 20. Clearances are allowed between all mating surfaces and allow flanges 59B to move within the grooves 34 without frictional contact during operation.

VA-2c(1) (c). Cable and Cable Guide Means of the Basic Embodiment

Like the retainer rail assembly 59, a cable guide assembly 39 is also L-shaped (FIG. 6), having a vertical wall 39A formed back-to-back with the rail 59 on the rear of the carriage 50 and extending downward terminating perpendicular to guide surface plate 39B. As best shown in FIG. 5, guide assembly 39 is mounted flush at the right side of carriage body 51 and extends leftward to about seven-eights the distance across the rear of the body 51. A rectangular cable exit slot 40 is formed into the top of the track 54 and is offset to the left such that the right edge is approximately three-eights the X-stroke (defined earlier) from the center of body 51. The slot 40 may be alternatively formed in the end wall 61C at the rear of the top cover 61. The flexible main cable 110 extends through the slot 40 and is shaped to bend vertically downward to contact plate 39B and is also shaped to lay parallel upon plate 39B and fixed thereto near the left end by a clip 41.

The cable 110 connects the external connecting cable 21 through converter 112 to the movable carriage 50 and is extremely thin and flexible; being easily and frequently curled between contact plate 39B that moves with the carriage 50 and the stationary contact area 28C within the cable well cavity 28 of the outer case 23. The cable 110 is fixed within the cable well 28 by clips 28A and 28D. The segment of the cable 110 between clips 41 and 28A is the active segment of the cable 110. This segment flexes and curls as the carriage 50 is moved, and is of a length slightly exceeding one-half the X-stroke, plus one-half times pi (3.1414) times the vertical distance between contact area 28C and the top of plate 39B. Further, clips 41 and 28A are vertically aligned when the carriage 50 is centered and both being located such that the right edges are at a distance to the left of the center that is approximately three-eights the X-stroke. These specifications are necessary to allow easy bending of the active section of the cable 110 during movement of the carriage 50.

VA-2c(2). Carriage Top Cover of the Basic Embodiment

FIGS. 6 and 7 best show that the carriage top cover assembly 61 includes a roof section 61A, side walls 61B and end walls 61C. These members form an inverted rectangular enclosure. The cover 61 extends from positions flush with the outer extremities of each retainer rail side plate 59A (FIG. 6) located on the front and rear ends of the carriage body 51, thus having substantially the length of the base 30. Cover 61 has the width of and is fixed upon body 51, secured with suitable fasteners (not shown).

Each side wall 61B projects vertically downward from the roof section 61A and terminates at a perpendicular joined support track 62 (FIG. 7). Each track 62 on each side of the cover 61 together form the lateral extremities of cover 61. Each track 62 contains the rectangular support channel 63 formed in the upper surface and a U-shaped pointer retainer groove 66 formed in its outer side similar to channel 33 and groove 34 in track 32. The tracks 62 along with both channels 63 and grooves 66 extend the entire length of the cover 61. Each channel 63 is parallel to the other on the left and right sides of cover 61 and is perpendicular to each channel 55 facing downward from the body 51. The channels 55 support movement of the pointer 80 similar to the previously described means by which channels 33 support the carriage 50.

The encoder access slot 64 and a switch connecting cable well 65 are formed along the Y-axis of the roof 61A, both offset to the right. The access slot 64 is positioned directly above the roller 136A, which is a member of the Y-axis encoder disk assembly 136 (FIG. 7). The slot 64 has a width to allow sufficient clearances around the rack 85 which extends downward into the slot 64. The cable well opening 65 is located away from the encoder access slot 64 at a distant to align with a connector 104 on the main board 100.

The well opening 65 joins the track 62 on the right side and is sufficiently wide to accommodate switch cable 103 with generous clearances on each side. These openings 64 and 65 span the length of cover 61 between the walls 61C at each end. Flanges extend downward from the perimeters of these openings to maintain rigidity.

Track bumper caps 67 (FIG. 5) are formed at each corner of the cover 61 at each end of each track 62 in the same manner as caps 35 associated with tracks 32. These may be composed of a hard rubber material and may be mounted by various means including bonding or to have pegs wedged into holes at the mounting points (not shown).

VA-2d. Pointer Assembly of the Basic Embodiment— FIGS. 5, 6 & 7

The pointer assembly 80 is best shown in FIG. 5, which is an exploded view. Pointer 80 includes a base assembly 80A and an operation plate 87, and houses parts including two select buttons 95A and 95B, micro switches 165 and 166, a pointer circuit board 160 and an optional retractable operation knob 164. The pointer 80 is the pointing element and together with the select buttons 95A and 95B allow full control of all functions of the pointing device 20.

VA-2d(1). Pointer Base Assembly of the Basic Embodiment

The pointer base assembly 80A is plate-shaped and is approximately square, typically with dimensions along each side approximately equivalent to one-half that of the base 30. The pointer base 80A has a guide track 81 formed at each side. The U-shaped guide channels 82 are formed on the underside of the guide tracks 81. The guide channels 82 face downward and form mirror images of support channels 63 facing upward from and formed in carriage cover 61 upon which pointer base 80A is mounted. FIG. 7 shows that the ball bearings 47 fit upon the edges 63A and 63B of the support channels 63 and fitting beneath the edges 82A and 82B of guide channels 82 similar to the previously described means concerning the channels 33 and 55. The channels 63 and 85 have the same width and depth as those previously described for channels 33 and 55.

An enclosed rectangular recess 83 (best shown in FIG. 5) is formed on the upper side of pointer base 80A which has a rectangular switch connecting cable access opening 84 located in the right-rear corner. A clearance recess 83A is formed on the underside of base 80A that extends across the entire Y-axis of the base 80A and terminating laterally beyond each side of the roof 61A. The recess 83A is sufficiently deep to provide a liberal clearance between the base 80A and roof 61A (FIG. 7). Clearance recess 83A can be eliminated by adjusting the dimensions of other components to provide a sufficient clearance between roof 61A and the underside of pointer base 80A.

FIG. 7 best shows that the T-shaped encoder operating rack 85 is mounted in a T-shaped rack mounting groove 85A, formed on the underside of the pointer base 80A. Both, the rack 85 and groove 85A span the full extent of the Y-axis extremities of pointer base 80A. Rack 85 projects downward to reach the roller 136A that operates the encoder disk assembly 136. The rack 85 is composed of a firm rubber material similar to that described earlier for rack 38, but both may be composed of other materials having sufficient rigidity and resiliency.

A retainer rail assembly 86, includes two sections arranged in an L-shaped configuration, having a support plate 86A that is joined perpendicularly to the outer edge of track 81, extends vertically downward to a retainer flange 86B. The flange 86B is accommodated by the retainer groove 66 formed in track 62 such that a clearance exists between all mating surfaces to allow relative movement between the surfaces without frictional contact during normal operation. Two flanges 86B, one being located within the grooves 66 on each side, hold the pointer 80 in place during transport and handling of the pointing device 20.

VA-2d(2). Pointer Operation Plate of the Basic Embodiment

The pointer operation plate 87 forms the top of the pointer assembly 80, and is the actual member by which the pointing device 20 is operated. As best shown in FIGS. 6 and 7, the operation plate 87 has dimensions along each side that are substantially less than that of the pointer base 80A to keep all user applied force close to the center of the pointer 80. The plate 87 also overhangs an even smaller rectangular skirt 93 along each side that has dimensions to sufficiently accommodate the housing of internal components. The lateral dimensions of skirt 93 are made as small as possible to allow top surfaces of the outer case, 25 and 25A, to be as wide as possible, but sufficiently narrow to remain clear of the pointer 80 during operation near the limits of its movement field. The front and rear sides of skirt 93 project below the right and left sides of the skirt 93 to form two mounting alignment tabs 94 that fit into recess 83. As best shown in FIG. 5, select button opening 89A and 89B are located at respective sides of the plate 87, adjacent a circular hole 88 in the center that accommodates an optional retractable knob 164. The button opening 89A and 89B are shaped to accommodate select buttons 95A and 95B with a clearance along the perimeters. Operation assist recesses 91 are located to the front and rear of hole 88. Additional recesses 91 are located upon the select buttons 95A and 95B. The recesses 91 each consists of a disk-shaped primary recess 91A sufficiently large to accommodate the tip of a pencil eraser and a secondary recess 91B sized to accommodate the writing tip of a pen or pencil and is located in the bottom center of the primary recess 91A (best shown in FIG. 7).

An accessory device mounting hole 90 is located near each corner of the operation plate 87 (FIG. 5), and one additional mounting hole 90 is located midway along each side. Select button hinge retainer channels 92 are formed on the underside of plate 87. Each channel 92 is V-shaped in cross section (FIG. 7) where the sides form an angle of approximately 90 degrees. Each channel 92 is routed along a U-shaped course centered on and adjoining outer edges of each select button opening 89A and 89B.

VA-2d(3). Pointer Circuit Board of the Basic Embodiment—FIG. 5

FIG. 5 best indicates that the rectangular circuit board 160 is mounted within the recess 83, and having a set of connector contacts 161 positioned near the right-rear corner aligned over access hole 84. Select switches 165 and 166 are mounted near each side of the board 160, with conductors (not shown) communicating to contacts 161. The switch connecting cable 103 extends from circuit board 100 within carriage 50 through cable well 65, continuing into pointer 80 through the access opening 84, and attaches to contacts 161 by a terminal 105 at the end of cable 103. The cable 103 has an active section that consists essentially of the entire length between terminals 104 and 105. This section has a length slightly exceeding one-half the Y-stroke (defined earlier), plus one-half times pi (3.1414) times the vertical distance between contact area 106 on the board 100 and the contact area 84A underneath the pointer base 80A. When the pointer 80 is centered, the free section of cable 103 aft of connector 105 is positioned towards the rear of the pointer base 80A and begins at a distance along the Y-axis approximately three-eights the Y-stroke from the center. The cable 103, connected at the contacts 161, is fixed within opening 84 and bent such that it contacts the area 84A underneath the pointer 80. The active section of cable 103 moves along mostly below access slot 65 and flexes and curls between the area 106 on board 100 that is stationary and the area 84A on the pointer 80 that moves.

VA-2d(4) Retractable-Extendable Operation Knob—FIGS. 5 & 7

Circuit board 160 also has a circular opening 162 located at its center for mounting the optional retractable operation knob 164. The knob 164 is a cylindrical sleeve where a pencil can be mounted in the interior hole 164A, while knob 164 is extended or retracted. The knob 164 terminates at the bottom as a threaded flange 164B that is substantially larger in diameter than the upper part of the knob 164. A mounting sleeve 163 serves as a mounting means as well as a harbor for the knob 164 while retracted. The bottom of the sleeve 163 is fitted within the circular opening 162 in board 160 and is mounted to board 160 by flange 163A near the bottom 163B of the sleeve 163. As best shown in FIG. 7, the flange 164B is threaded into the mounting sleeve 163 that has mating threads 163C on the inside surfaces. Two screw operation slots 164C are formed on opposite side walls of the upper extremity of the sleeve-shaped knob 164 to enable turning the threaded knob with a coin, paper clip or the like to extend or retract the knob 164.

VA-2d(5). Select Buttons of the Basic Embodiment—FIGS. 5 & 7

Each select button 95A and 95B is positioned upon a respective switch actuating plunger 165A and 166A, projecting through openings 89A and 89B to be substantially flush with the top surface of plate 87. FIG. 5 shows that the buttons 95A and 95B are generally rectangularly elongated along the Y-axis of pointer 80, having the inside facing corners chamfered and a semicircular notch at the center of the inside edge to conform with the shape of openings 89A and 89B. Each of the buttons 95A and 95B is retained within plate 87 by two attached retainer pegs 97 extending from the inside edge inward near the semicircular notch, and by an attached multi-way retainer hinge 96 at the outer edge that consists of a V-shaped, upward facing ridge 96A that mates into one of the V-shaped channels 92. The V-shaped sides of hinges 96 are approximately 60 degrees apart in cross section, thus, can be pivoted within channels 92 as the buttons 95A and 95B are depressed (FIG. 7). The U-shaped course of the hinges 96 and mating channels 92 are positioned to surround the center of each switch activating plunger 165A and 165B on three sides and provide a lever action to reduce the force required to activate switches 165 and 166. Micro switches 165 and 166 are prefabricated and are available from sources known to those skilled in the art.

It is noted that the height of skirt 93 determines the height of plate 87 against which buttons 95A and 95B are held by the switch plungers 165A and 166A. Thus, the skirt height is adjusted for the thickness of parts used to insure that buttons 95A and 95B are held against the plate 87 just snugly enough to eliminate any free play of the buttons 95A and 95B while the plungers 165A and 165B are in their normally open (up) positions.

VA-2e. Main Circuit Board of the Basic Embodiment—FIG. 5

As best indicated in FIG. 5, the main circuit board 100 is mounted in the bottom front section of carriage 50 between the front end wall 51B and the encoder shaft access slot 53. A secondary circuit board 120 may be used as needed and can be located between the rear end wall 51B and access slot 53. The boards 100 and 120 communicate through the jumper conductors 116 which bridge upward to clear encoder rack 38 that projects up into the space between the boards 100 and 120. The main components on the circuit board 100 are the encoder support block 130, the encoder disk assemblies 135 and 136, photo emitter elements 124, photo detector elements 125, a microprocessor 129 and the switch connector cable terminal 104 (other necessary circuitry not shown). Cable connector 111 may also be mounted directly on the main board 116 in place of conductors 116 if the supplementary board 120 is omitted. The microprocessor 129 and other electrical circuits are identical to those used in conventional mouse and trackball devices with only two modifications; one, the micro switches 165 and 166 are mounted remotely from the main board 100 within the pointer 80, communicating through cable 103; and two, the output leads connecting each pair of photo detectors 125 to the microprocessor 129 are cross connected. The latter is necessary because in this basic embodiment of the pointing device 20, the encoder operation shafts 135D and 136D, as viewed from the top of the device, rotate toward the direction of device movement; whereas in conventional mouse and trackball devices, the equivalent, shafts as viewed from the top, rotate away from the direction of device movement.

The circuit board 100 has an encoder disk clearance slot 101 for each of the two encoder disk assemblies 135 and 136. Slots 101 allow available vertical space within the carrier 50 to be utilized such that the size of the encoder disks 135C and 136C can be maximized and the height of carrier 50 can be minimized.

VA-2e(1) Encoder Disks of Basic Embodiment—FIGS. 5, 6 & 7

The encoder disk assemblies 135 and 136, are central to the operation of the pointing device 20. It is stressed that the location of the encoder support block 130, into which the encoder disk assemblies 135 and 136 are mounted, determines the location and dimensions of many other parts. Thus, the pointing device 20 is built around the support block 130 and encoder disk assemblies 135 and 136. Block 130 has a wall 131 that forms two rectangular support block wells 132, one perpendicular to the other in an L-shaped arrangement and both being flush to the right side of wall 131. The wells 132 are open at the tops and the bottoms to surround the photo emitters 124 and detectors 125, mounted on the main board 100 on opposite sides of clearance slots 101, and the encoder disks 135C and 136C that are centered within the slots 101. Support block 130 has bearing holes 133 through each wall section 131 at locations in the center of wells 132. The encoder shafts 135D and 136D pass through the bearing holes 133 and through the encoder disks 135C and 136C located within the wells 132. The shafts 135D and 136D also pass through the optional operation rollers 135A and 136A that are positioned adjacent the front and right sections of wall 131 of the support block 130. The encoder disks 135C and 136C are essentially conventional in design and have elongated hubs 135B and 136B, respectively, formed concentrically at the center to reinforce mounting the disks 135C and 136C on the shafts 135D and 136D and to space the disks 135C and 136D at the appropriate location along the shafts 135D and 136D within the wells 132. A clearance is allowed along the shafts 135D and 136D between each hub 135B and 136B and the interior of wall 131 and also between the rollers 135A and 136A and the exterior of the wall 131.

It is emphasized that the support block 130 is mounted such that the Y-axis encoder shaft 136D is substantially centered within the range of travel of the pointer 80. The X-axis encoder is mounted for convenience within the common mounting block 130, but may be alternatively mounted on a separate block as given for an alternative embodiment. Block 130 has mounting holes 134 and is fixed to board 100 with screws (not shown) projecting from the underside of the board 100, and is composed of a rigid plastic material similar to that used in prior art devices for bearing the shafts of rotary encoders.

It is also emphasized that block 130 is formed such that the encoder shafts 135D and 136D are vertically centered along the Z-axis between the floor 51C of the carriage body 51 and the roof 61A of the carriage cover 61 (FIGS. 6 and 7). An essential requirement is that the vertical position of the top of track 54 is substantially below the vertical position of the top of the roller 135A, and is ideally at the centerline of the shafts 135D and 136D. The latter is particularly important when the rollers 135A and 136A are made small or eliminated to maximize resolution. Alternatively, the shaft 136D may be mounted substantially higher than shaft 135D to obtain proper clearances between the rack 85 which passes closely over rack 38 when very small shafts are used.

In large scale units, the Y-axis encoder is mounted in the pointer 80 rather than in the carriage 50. In this case the rack 85 is fixed to the carriage 50. This eliminates the requirement for the pointer 80 to have the length of the rack 85 and maximizes the Y-stroke for a given Y-axis length.

VA-2e(2) Encoder and Resolution Performance Factors

It is appreciated by those skilled in the art that the encoder operating racks 38 and 85 maintain a perpendicular attitude to the encoder shafts 135D and 136D, respectively, and provide a larger contact area with the rotational surfaces compared to ball operated mechanisms in prior art devices. This capacitates consistent frictional contact with small rollers or directly with shafts as small as even 0.5 millimeters in diameter without rollers. It is also appreciated that reducing the diameter of the encoder's driven member, whether shaft or roller, by one-half doubles the resolution of the pointing device.

A typical construct of this basic embodiment, for example, may have encoder disks 135C and 136C that are 1.59 centimeters (⅝ inches) in diameter and having 40 slots approximately 0.45 millimeters wide, with shafts 135D and 136D that are 1.6millimeters (¹⁄₁₆ inches) in diameter, being directly driven without rollers 135A and 136A. The resolution will be approximately 320 counts per centimeter (815 counts/inch). The resolution can be easily doubled to 640 counts per centimeter (1630 counts/inch) by reducing the driven sections of the shafts to 0.8 millimeters (¹⁄₃₂ inches), Such a typical construct in the above example may have a base plate 31 that is 12 centimeters (4¾ inches) on each side and a carriage width of 5.7 centimeters (2¼ inches) to have X and Y strokes of about 6 centimeters (2⅜ inches) with space occupied at each end of the tracks by bumper caps. Thus, such a device can generate approximately 1920 counts (320 counts per cm×6 cm) across each direction of the active area, and as described above, can be easily doubled to 3840 counts.

VA-2f. Ball Bearing Assemblies—FIGS. 5 & 8

As shown in FIG. 5, the bearing assemblies 46 comprise a plurality of ball bearings 47, each mounted in a socket 49 formed in elongated retainer sleeves 48. The ball bearings 47 are composed of a hard material such as chromium steel, and typically have a diameter of 4.76 millimeters (³⁄₁₆ inches).

Previous descriptions disclosed means by which the ball bearings 47 function. It is further noted that since the ball bearings 47 are held in positions along the channels only by means of frictional contact with the channels, the ball bearings 47 and retainer sleeves 48 move along the support channels 33 and 63 in response to movement demanded by guide channels 55 and 82 which move upon the ball bearings 47. Movement of the ball bearings 47 and sleeves 48 along the support channels 33 and 63 is at a rate that is one-half the rate that the guide channels 55 and 82 are moved. Individual ball bearings are overtaken by and move from beneath the moving guide channels 55 and 82, thus, requiring additional ball bearings 47 to be available along the sleeves 48 to move beneath the channels 55 and 82. Therefore, retainer sleeves 48 exceed the length of channels 55 and 82 by one-half the length of the X and Y strokes, respectively, and supply ball bearings 47 at closely space intervals along their lengths.

The retainer sleeves 48 can be constructed inexpensively and can be composed of thin plastic tubes of the type used for constructing thin drinking straws. The tubes are typically up to 6.32 millimeters (¼ inches) in diameter and pressed such that the cross sections are elliptical, and having a length as previously described.

The sockets 49 are formed by punching holes through the center of two opposing walls of the sleeves 48 while the opposing walls are perfectly flattened and in contact with one another. The holes forming the sockets 49 are made oblong while the sleeves 48 are in this manner. The long axes of the oblong holes are perpendicular to the longitudinal axes of the sleeves, and are approximately 1.25 times the diameter of the ball bearings 47; whereas the short axes are approximately 0.87 times the diameter of the ball bearings 47. The spacings between the socket centers, thus, the spacing of the ball bearings 47, are typically 8 to 10 millimeters (¼ to ⅜ inches) from center-to-center. Each of the ball bearings 47 is pushed directly into each socket 49 while the major axis of each elliptical sleeve 48 is compressed slightly inward, and the edges of the sockets being deformed during insertion. The balls 47 fit within the sockets 49 with noticeable but slight free play in all directions. When assembled with the ball bearings 47, the retainer sleeves 48 have a distance across the minor axis of their cross sections equivalent to approximately one-half the diameter of the ball bearings 47.

VA-2g. Setup and Use of the Pointing Device of the Present Invention

Before using the pointing device 20 after it has been transported, it is required that the bearing assemblies 46 be centered along the support tracks. This is accomplished by placing the device in its normal operating position, then moving the pointer 80 fully to each extent of its active area in all directions about 2 to 3 times, while noting but continuing despite any frictional resistance felt when the bearing assemblies 46 are arrested by track end caps 35 and 67. This requires the carriage 50 or pointer 80 to be slid, rather than rolled, over the arrested bearing assemblies 46 to be moved to the ends of the tracks. The process is complete when the resistance is no longer present and the carriage 50 and pointer 80 roll freely upon the bearing assemblies 46 along the entire length of the tracks 32 and 62.

VA-2g(1) Connection and Software Installation and Set Up

The pointing device 20 is connected to the appropriate port of a computer A in the exact manner that a conventional mouse or trackball device is connected. Further, a software program well known to those skilled in the art as a mouse device driver, that is compatible with common conventional pointing device operation, is used with the pointing device 20 and must be properly installed. Before use with application software, the resolution factors (also known as mouse speed or sensitivity), meaning the ratio of movement counts per screen pixel, are set to match characteristics of the pointing device 20 to the computer's display. This is very important in the case of the pointing device 20 of the present invention because these and other factors allow full utilization of the capabilities of the pointing device 20. As is well known to those skilled in the art, a number of methods are available to adjust these ratios, but the most direct method is to use menu driven software commonly supplied with mouse driver software specifically for this purpose. In setting these ratios, the goal is to adjust the individual horizontal and vertical ratios such that all or nearly all the extent of the respective X-stroke and Y-stroke is required to move the cursor from one respective screen border to the other. This not only provides the highest possible resolution, but is important to maintain absolute mapping relationships.

VA-2g(1)a. Set Up With Menu Driven Software

Any acceleration factors and any features that automatically move the cursor without the pointer having to be moved such as "smart move" or "snap-to" are permanently disabled. Any cursor wrap-around feature such as "screen wrap" is disabled while the ratios are being adjusted; or permanently disabled if the software does not provide a feature such as "home cursor" or "locate" that allows the cursor to be moved to a designated screen location on demand by means other than device movement. The ratios are adjusted individually where the results are immediately tested by moving the device from boundary to boundary and noting whether the cursor moves from border to border. The ratios are adjusted for a fast cursor until the cursor reaches the borders before the device reaches its limits, then gradually adjusted downward until the cursor barely reaches the screen borders as the device reaches or nearly reaches its limits.

After settings are satisfactory, the cursor wrap-around feature can be enabled, if the conditions described previously are met. The wrap-around feature is helpful in preventing the mapping relationship between the cursor and the pointer 80 from becoming un-synchronized, a result that is possible if the ratios are not properly set. However, when an application is started, it may be necessary to synchronize the pointer 80 with the cursor by actuating the cursor homing feature while the pointer 80 is located in advance at the position corresponding to the screen position where the cursor will be moved by the cursor homing feature.

VA-2g (2) Operational Procedures

In use, the pointer 80 is moved by placing one or more fingers upon the surface of the pointer operation plate 87 or upon the select buttons 95A and 95B while other parts of the hand may steadied upon the top flange 25 or upon the desk or other convenient support. The pointer 50 may also be moved by a pencil or pen engaged within one of the assist recesses 91 located on the plate 87 and on buttons 95A and 95B. In the latter case, the pen or pencil is pushed downward to activate the select buttons as desired. An additional means, the retractable knob 164 is provided to assist pen-like maneuverability and can be fitted with a pencil or pen for additional variety. The select buttons 95A and 95B partially wrap around the retractable knob 164, being conveniently available to be depressed while the fingers are engaged around the knob 164. The select buttons 95A and 95B are operated by pressing directly downward on any portion of the surface, but to benefit by the lever action mechanism provided by the multi-way hinges 96, downward force is applied at the points farthest away from the center of the outer edges of the buttons 95A and 95B.

Upon startup of an application program for use, the screen cursor is synchronized with the position of the pointer 80 by moving the pointer 80 of the pointing device 20 to each border of its active area at least once before actually using the application. If a screen wrap-around feature is active, the cursor must be synchronized as previously described. The screen cursor remains synchronized with the position of the pointer 80 within its working area unless the ratios are not properly set.

V-B. A FIRST ALTERNATIVE EMBODIMENT

Figure 2:
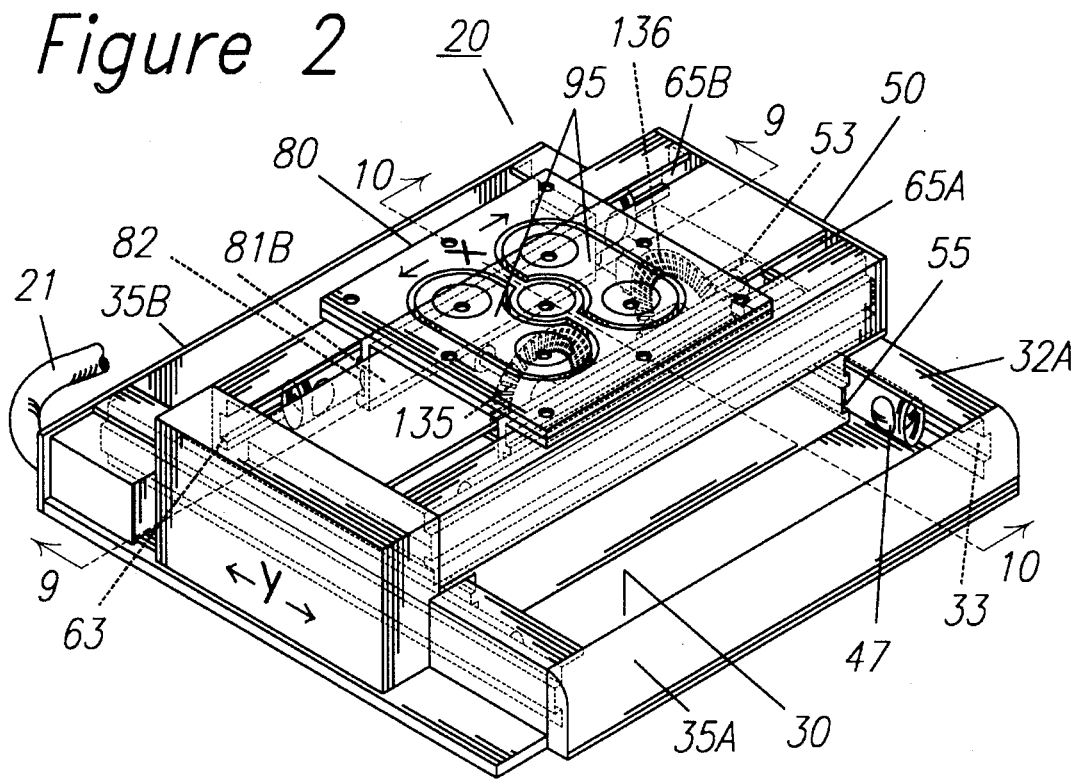
FIG. 2 is a left-front perspective view of a first alternative embodiment of the invention shown in FIG. 1.

An overall left-front perspective view of a first alternative embodiment of the pointing device 20 of the present invention is shown in FIG. 2. The immediately ensuing brief paragraphs summarize how this embodiment differs from the basic embodiment (described previously) and its comparative objectives and approaches. The brief summary is followed by detailed descriptions of FIGS. 8, 8A, 9 and 10.

VB-1. Summary Description of First Alternative Embodiment

The overall objective of the first alternative embodiment of the pointing device 20 is to rearrange or eliminate certain parts and combine functions of others to simplify reducing the size of the device to the minimum extent, while retaining encoder assemblies 135 and 136 and other electronics within the carriage 50. A second objective is to exhibit various alternative arrangements that can be applied individually or collectively to the basic embodiment as well. The following briefly describes how these objectives are achieved and represents the major differences between the first alternative embodiment and the basic embodiment. Most of these differences can be readily attained by comparing FIGS. 1 and 2.

a. The outer case 23 is eliminated, and other parts modified to provide protective and assist surfaces in the absence of the case 23.

b. Major assemblies are re-oriented in the X-Y plane, particularly the carriage 50 being elongated along the X-axis and movable along the Y-axis and the pointer 80 being movable along the X-axis.

c. Associated pairs of tracks (33 with 55, and 63 with 82) are oriented side-by-side rather than over-and-under as in the basic embodiment. This facilitates enclosure of ball bearing 46 within protective and assist surfaces, and eliminates the need for dedicated means to retain the base 30, carriage 50 and pointer 80 together as a unit, because the ball bearings 47 also serve this purpose in this embodiment. This also enables the use of large operation plates where force can be applied offset from the tracks, and further enables mounting and operating the pointing device 20 overhead such as in space travel vehicle applications.

d. Encoder operating racks 38 and 85 are eliminated as dedicated parts, where a right track flange 32A and the lower edge of track 81B are used to operate the encoders disk assemblies 136 and 135, respectively.

e. Prefabricated micro switches are replaced by space saving switch elements integrated into the select buttons 95 (FIG. 8A).

Figure 8:
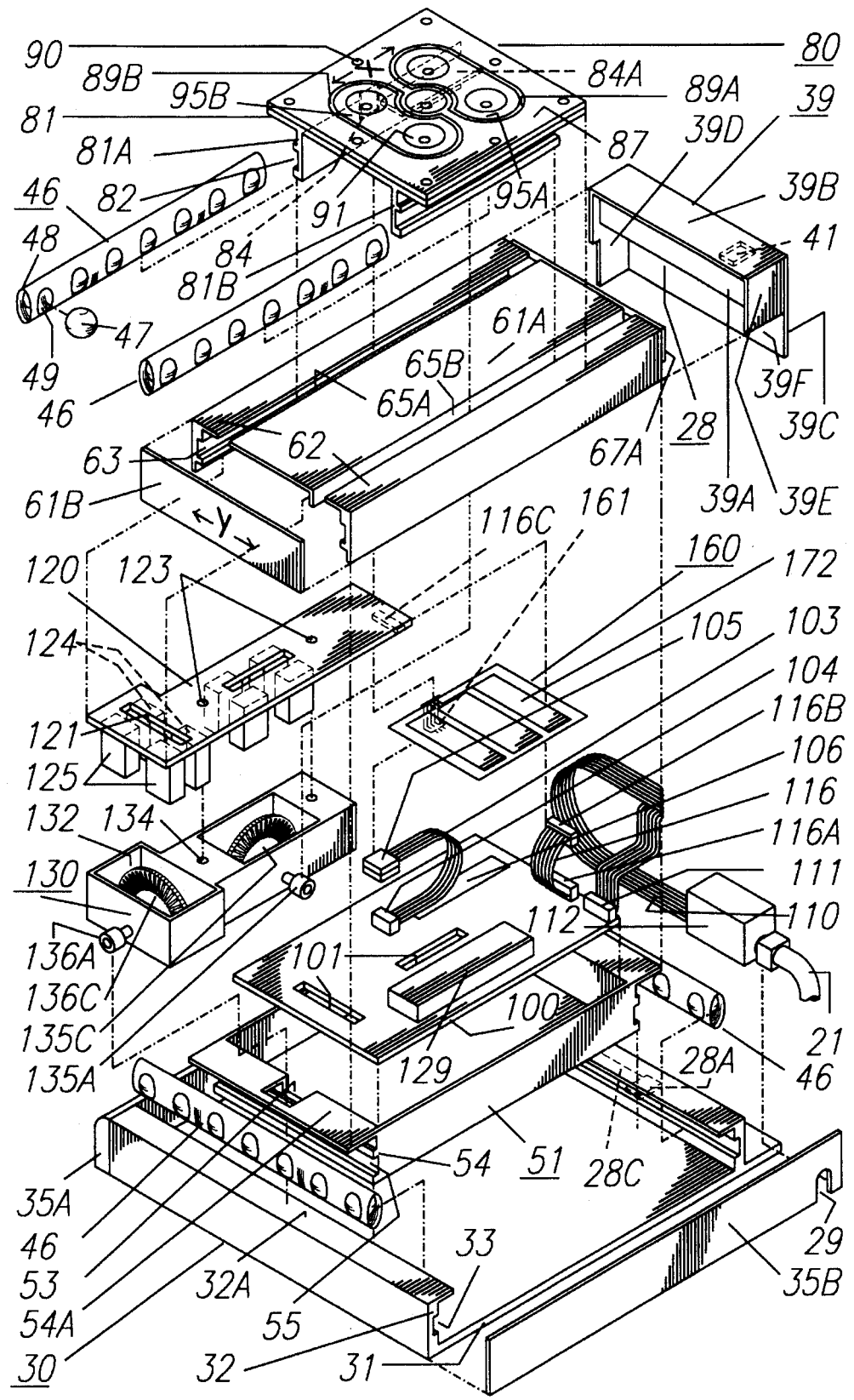
FIG. 8 is a partially exploded right-rear perspective view of the first alternative embodiment shown in FIG. 2.

. Base walls 35A and 35B replace track caps 35 and span the entire distance between supporting tracks 32 at each end of the base 30, forming a partial enclosure of the front and rear for use, respectively, as an assist surface and a mounting means for the connecting cable 21. Similarly, side enclosures 61A and 67B of the carriage cover 61 are used as bumper caps at the ends of the supporting tracks 62 (FIG. 8).

g. Wells 132 in encoder support block 130 are arranged to position the encoder shafts 135D and 136D at locations as required by operating rack substitutes 32A and 81B.

h. Cable guide 39 is inverted compared to the guide 39 of the basic embodiment and is partially enclosed to serve in the absence of the cable well 28 of the basic embodiment.

VB-2. Detailed Description of the First Alternative Embodiment

Figure 9:
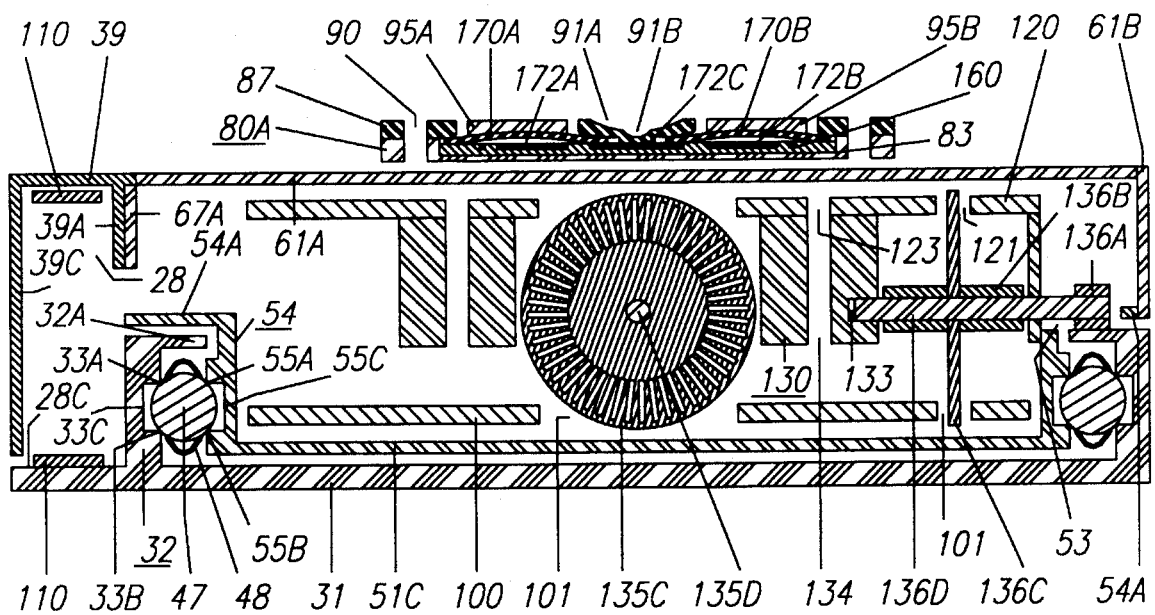
FIG. 9 is a lateral section view of the first alternative embodiment shown in FIG. 2, taken along the section line 9—9.
Figure 10:
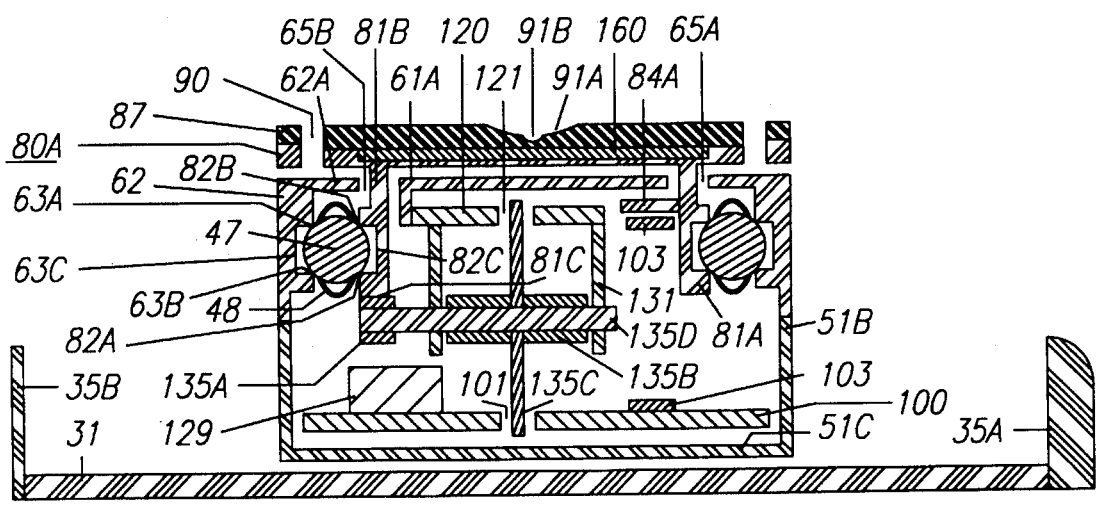
FIG. 10 is a longitudinal section view of the first alternative embodiment shown in FIG. 2, taken along the section line 10—10.

Detailed descriptions of major differences related to the first alternative embodiment briefly summarized immediately above are now expanded in detail. FIG. 8 shows most of the features in perspective, but FIGS. 8A, 9 and 10 are referred to for closer details as indicated in the descriptions.

VB-2a. Stationary Base of the 1st Alt. Embodiment—FIGS. 5, 8 & 9

A fundamental difference in structure of the base 30 is that tracks 32 are parallel to the Y-axis, rather than to the X-axis, and support movement of the carriage 50 along the Y-axis. The base plate 31 is divided into two sections by the left track 32, where the left edge is located at a distance from the left extremity to provide a stationary main flexible cable contact area 28C (FIGS. 8 and 9). The other fundamental structural difference is that the support tracks 32 and 62 are positioned beside the guide tracks 54 and 81, and which influences and makes some of the other structural alternatives possible. The base support tracks 32, projecting upward from the base plate 31, have top cover flanges 32A projecting inward, the U-shaped support channels 33 also projecting inward with the channel bottoms 33C oriented vertically (FIG. 9). The top surface of the flange 32A on the right is in frictional contact with and serves as the rack for operating the Y-axis encoder disk assembly 136. Track caps 35 are replaced by base end walls 35A and 35B that extend across both tracks at the front and rear, respectively. The wall 35A has a rounded shape on the upward outer corner to provide a surface for comfortably placing parts of the hands during operation of the pointing device 20, the rear wall 35B having a connecting cable access slot 29 to receive the cable converter 112 and the connecting cable 21.

VB-2b. Carriage Assembly of the 1st Alt. Embodiment—FIGS. 5, 8 & 10

The carriage 50 is elongated along the X-axis direction and moves along the Y-axis as the device is operated. The carriage body 51 is similar to that in the basic embodiment, being suspended mostly between the tracks 32 on the base 30, but in this first alternative embodiment, the tracks 54 are vertically oriented and serve as the side walls, and having the U-shaped guide channels 55 formed on the outer sides and facing outward to form mirror images of the support channels 33 (FIG. 9). Extension end flanges 54A project laterally from the tops of tracks 54 at a height such that the flanges 54A are parallel to and above flanges 32A on the base support tracks 32. End flanges 54A serve as bottom covers to the ends of the carriage cover 61. The slot 53 is formed in the top of right track 54 near the center and extending into the right end flange 54A of the carriage body 51 (FIG. 8), allowing shaft 136D and roller 136A of the Y-axis encoder to gain access to the top of the track flange 32A.

The carriage cover assembly 61 is comprised primarily of the support tracks 62 at each end (front and rear), which are oriented vertically and have cover flanges 62A that serve to partially enclose the ball bearing assemblies 46. The U-shaped support channels 63 are formed in the inner facing sides of tracks 62 with the channel bottoms 63C oriented vertically. The left and right side walls 67A and 61B, respectively, of the cover 61 serve as track bumper caps, the left wall 67A providing a mounting surface for an inner wall 39A of a cable guide 39.

The roof 61A of cover 61 comprises a section located across the center from bumper cap 67A to which it is joined and extending laterally to the right end wall 61B (FIG. 10), and extends toward the front and rear tracks 62 at a distance to form slots 65A and 65B at the front and rear, respectively. Roof 61A has a flange projecting downward from the rear edge for reinforcement. The slots 65A and 65B provide assess for guide tracks 81A and 81B on the pointer 80 to project into the carriage 50 for engaging and mounting around the ball bearing assemblies 46.

VB-2c. Pointer Assembly of the 1st Alt. Embodiment—FIG. 8A

As best shown in FIG. 8A, the pointer assembly 80 comprises a pointer base assembly 80A with a pointer operation plate 87 mounted directly thereto, and omits the skirt 83 used in the basic embodiment. Pointer base 80A has guide tracks 81A and 81B projecting downward from the underside near each respective front and rear end of the pointer base 80A. The lowest extremity of the rear track 81B serves as the operating rack for the X-axis encoder disk assembly 135 instead of the separate encoder operating rack 85 used in the basic embodiment. The switch connecting cable access hole 84 is located at the front just right of the center of recess 83, and is formed downward into the rear of the front guide track 81A to a location below the contact surface platform 84A. The thin conductor 161 extends downward from board 160, passing through the slot 84 and connects to terminal 105 located at the end of platform 84A. The platform 84A projects towards the rear from track 81A to a distance approximately equivalent to the width of cable 103 and is positioned to be parallel to and below the roof 61A when the pointer 80 is mounted on the carriage 50. Platform 84A provides a surface beneath which switch connecting cable 103, being held by clip 84B, is guided between the movable pointer 80 and the stationary surface 106 on the main board 100.

VB-2d. Select Button Switches of the 1st Alt. Embodiment—FIG. 8A

Shown in FIG. 8A, the first alternative embodiment has inventive select switches that have active contacts 170A and 170B integrated on the underside of select buttons 95A and 95B, and have tabs 171A and 171B that also serve as button retainers. The tabs 171B face inward from each contact 170A and 170B and are positioned upon a common contact 172C on the circuit board 160 and beneath the retaining edges of plate 87, while the outward facing tabs 171A are positioned between non-conductive edges of the board and the plate 87 (best shown in FIG. 9). Switch contacts 172A and 172B located on the circuit board 160 are positioned closely beneath active contacts 170A and 170B that are pushed downward when buttons 95A and 95B are depressed, thus closing circuits. Switches 170A and 170B have short action and require little force to be activated, thus minimizing interference between switch activation and pointing, and requiring substantially less vertical space than prefabricated switches 165 and 166 used in the basic embodiment.

VB-2e. Guidance Means of the 1st Alt. Embodiment—FIGS. 9 & 10

Ball bearing assemblies 46 serve an additional function in the first alternative embodiment. Being partially engaged in pairs of horizontally facing U-shaped channels, each bracketing the ball bearings 47 above and below the centerline from opposite sides, the ball bearings 47 restrain Z-axis movement between the facing pairs of support channels 33 and guide channels 55 on each side of the base 30 and the carriage 50 (FIG. 9). Facing pairs of support channels 63 and guide channels 82 at the front and rear of the pointer 80 and carriage 50 are similarly held together by ball bearings 47 positioned there between (FIG. 10). In this arrangement, each of the ball bearings 47 is supported on the outer sides by the lower channel edges 33B and 63B of the channels 33 and 63, and each supports only the top edge 55A and 82B of the guide channel 55 and 82 on the opposing sides of the ball bearings 47. Lateral alignment of the guide channels 55 and 82 depend on corresponding guide channels and support channels on opposite sides of the base 30, carriage 50 and pointer 80. FIGS. 9 and 10 show that the ball bearing retainer sleeves 48 are oriented such that the major axes of the elliptical cross sections are oriented vertically, the sockets 49 formed in the sides, expose the sides of ball bearings 47 to the side edges of the channels. The retainer sleeves 48 are also smaller in cross section than those described for the basic embodiment in order to fit within the shallower vertical clearances.

FIGS. 9A and 10A which are fragmentary views of the sections shown in FIGS. 9 and 10, respectively, show support tracks 32 and 62 inward of guide tracks 54 and 81. This alternative arrangement provides more space within the carriage 50 and easier assembly of the pointing device 20, since the ball bearings are external to the carriage 50, and eliminates access slot 65A from the roof 61A of the carriage 50. Access slot 64 is formed similar to slot 53 of this embodiment (FIG. 8) to accommodate access of the encoder shaft 135D to the lower edge of track 81B which operates the encoder disk assembly 135. A cable well 65 (not shown) is located on the upper surface of roof 61A similar to that shown for the basic embodiment.

VB-2f. Circuit Boards of the 1st Alt. Embodiment—FIG. 8

The first alternative embodiment as best shown in FIG. 8 uses a supplementary circuit board 120 for mounting the encoder support block 130, and photo emitter and photo detector elements 124 and 125, which project downward from the board 120 mounted under the top cover 61. Other components including the microprocessor 129 are mounted upward on the main board 100 in the body 51. The boards 100 and 120, facing each other, communicate through cable 116, and have slots 101 and 121 to accommodate encoder disks 135C and 136C. Board 120 has holes 123 for mounting the encoder support block 130. It is noted that the supplementary circuit board 120 could be omitted in larger scaled units or if sufficient space is available on the main board 100 to mount the encoder support block 130 along with the photo emitters 124 and photo receivers 125. However, the encoder shafts 135D and 136D must be positioned appropriately to the track edge 81B and the flange 32A that serve as encoder operating racks.

VB-2g. Detection Means Arrangement in the 1st Alt. Embodiment—FIG. 8

FIG. 8 shows that the encoder support block 130 in this first alternative embodiment locates the Y-axis encoder 136 at the right side such that the shaft 136D and roller 136A extend through slot 53 to maintain frictional contact with the top of flange 32A, located on the right track 32. It is emphasized that the X-axis direction encoder 135 must be positioned in the exact center of the active area with respect to the X-axis, thus the support block 130 being elongated to accommodate this requirement. The X-axis encoder is driven by the lowest edge of the track 81B which is a part of the pointer 80. The racks (the top of flange 32A and the lower edge of track 81B) must be coated with a sufficiently deformable material (not shown) to broaden the frictional contact area with the surfaces of the rollers 135A and 136A without exerting excessive forces against the rollers. When the bare shafts are used without rollers 135A and 136A as shown for an alternative track arrangement in FIGS. 9A and 10A, the rack surfaces are extended to maintain contact with smaller driven diameters.

In connecting the output leads from the photo receiver elements 125 to appropriate pins on the microprocessor 129, it is observed that the encoder shafts 135D and 136D, as viewed from the top, rotate toward the direction of device movement which is opposite that of prior art mouse and trackball devices.

VB-2h. Main Flexible Cable Guide of the 1st Alt. Embodiment—FIG. 8

Shown in an exploded perspective view in FIG. 8, the cable guide 39 for this first alternative embodiment is partially enclosed, forming a cable well cavity 28 that is inverted compared to that formed in the case 23 of the basic embodiment. The guide 39 is mounted to the right side of carriage cover 61, and has an inner wall 39A, a top cover 39B, an outer wall 39C and a front wall 39D. Cable guide 39 further has a rear wall 39E extending from top cover 39B to approximately midway downward with an opening 39F formed rearward at the lower extent to clear the cable converter 112 during movement of the carriage 50 near the rear ends of the tracks 32.

It is noted that in this first alternative embodiment, the cable guide 39 is mounted on the right side of the device, but could alternatively be mounted on the left side. Also, the cable guide can be replaced by the type used in the basic embodiment such that a partial case is used only to provide an enclosed cable well.

VB-2i. Operational Features of the 1st Alt. Embodiment

As previously indicated, this first alternative embodiment of the pointing device 20 of the present invention is fundamentally equivalent in operation to the basic embodiment, and is set up and used in the same manner. However, as an alternative to maximize utility in a physically compact unit, some operational characteristics of this first alternative embodiment are different, particularly when the minimum practical size is approached.

As an example of capabilities, a typical small construct of this embodiment having support tracks 7 centimeters (2¾ inches) long, a pointer that is 3.5 centimeter by 3.5 centimeter (1¹³⁄₈ inches square) provides X and Y stroke lengths of 3.5 centimeters (1¹³⁄₈ inches) each, meaning that the pointer 80 moves within an active area that is 3.5 by 3.5 centimeters. Using similar encoder and shaft dimensions as given in the example for the basic embodiment, the 320 count per centimeter resolution will result in the production of 1120 counts over the pointer's range of travel along each axis. As described for the basic embodiment, the resolution and count productivity can be doubled to 640 counts per centimeter (1628 counts/inch) and 2240 counts, respectively.

The combination of alternative structures and arrangements that comprises the first alternative embodiment does not imply that they are inseparable, but can be used separately to substitute features of the basic embodiment to result in many different alternative combinations.

V-C. DESCRIPTION OF A SECOND ALTERNATIVE EMBODIMENT

Figure 3:
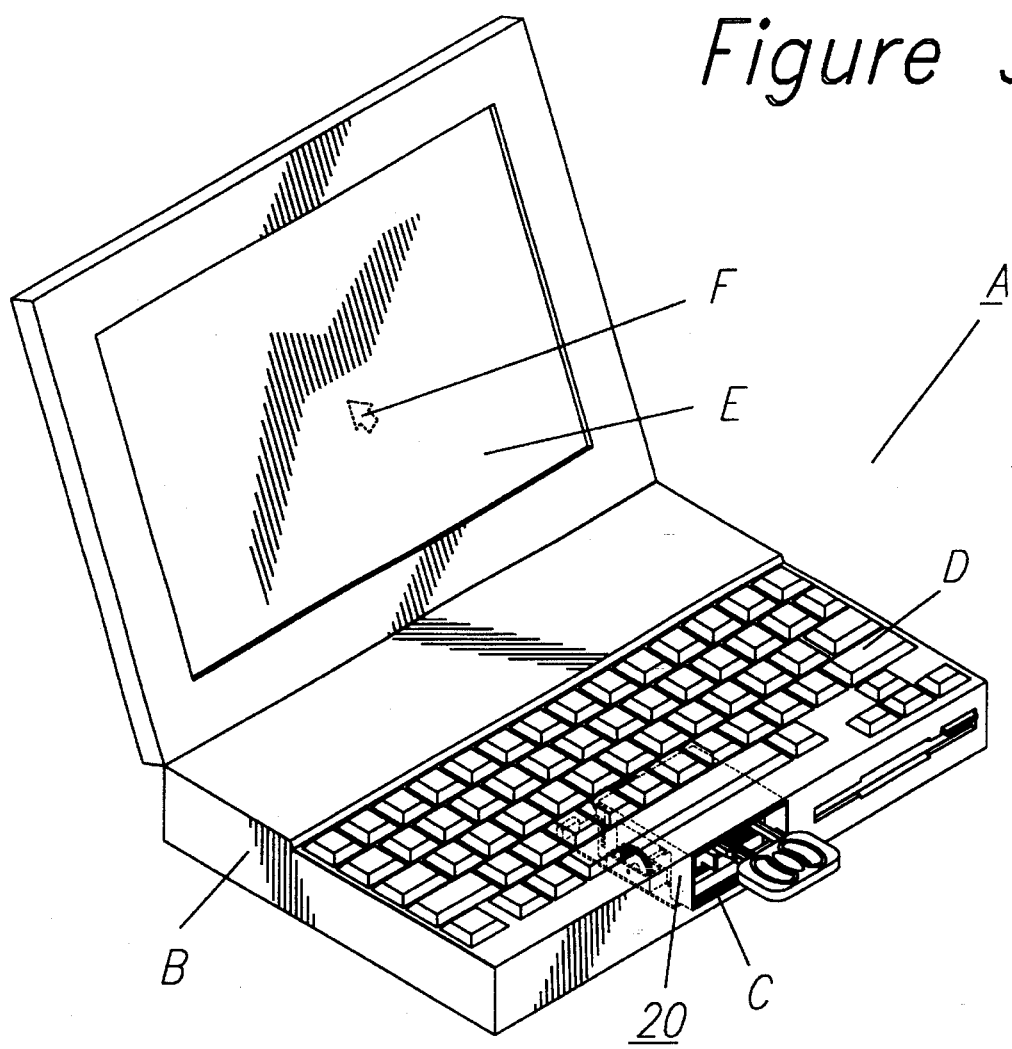
FIG. 3 is a left-front perspective view of a notebook-sized computer incorporating a second alternative embodiment of the invention shown in FIG. 1.
Figure 4:
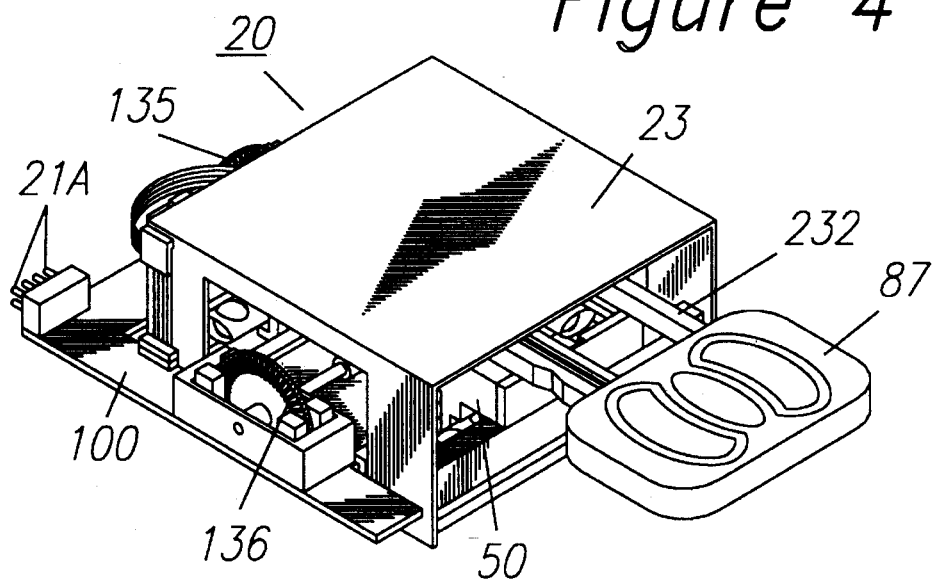
FIG. 4 is a left-front perspective view of the second alternative embodiment shown in FIG. 3, shown separately from the computer.

FIG. 3 shows a second alternative embodiment of the pointing device 20 of the present invention incorporated into a case B of a notebook-sized computer A, and being accessible through an access hole C in the front of the computer case B below the keyboard D. FIG. 4 shows a left-front view of the second alternative embodiment separately from the computer A. The immediately ensuing brief paragraphs provide a summary of the objectives and differences of the second alternative embodiment compared to the basic embodiment and the first alternative embodiment as well. This is followed by detailed descriptions of the differences where necessary.

VC-1. Summary of the Second Alternative Embodiment—FIGS. 3, 4 and 11

Figure 11:
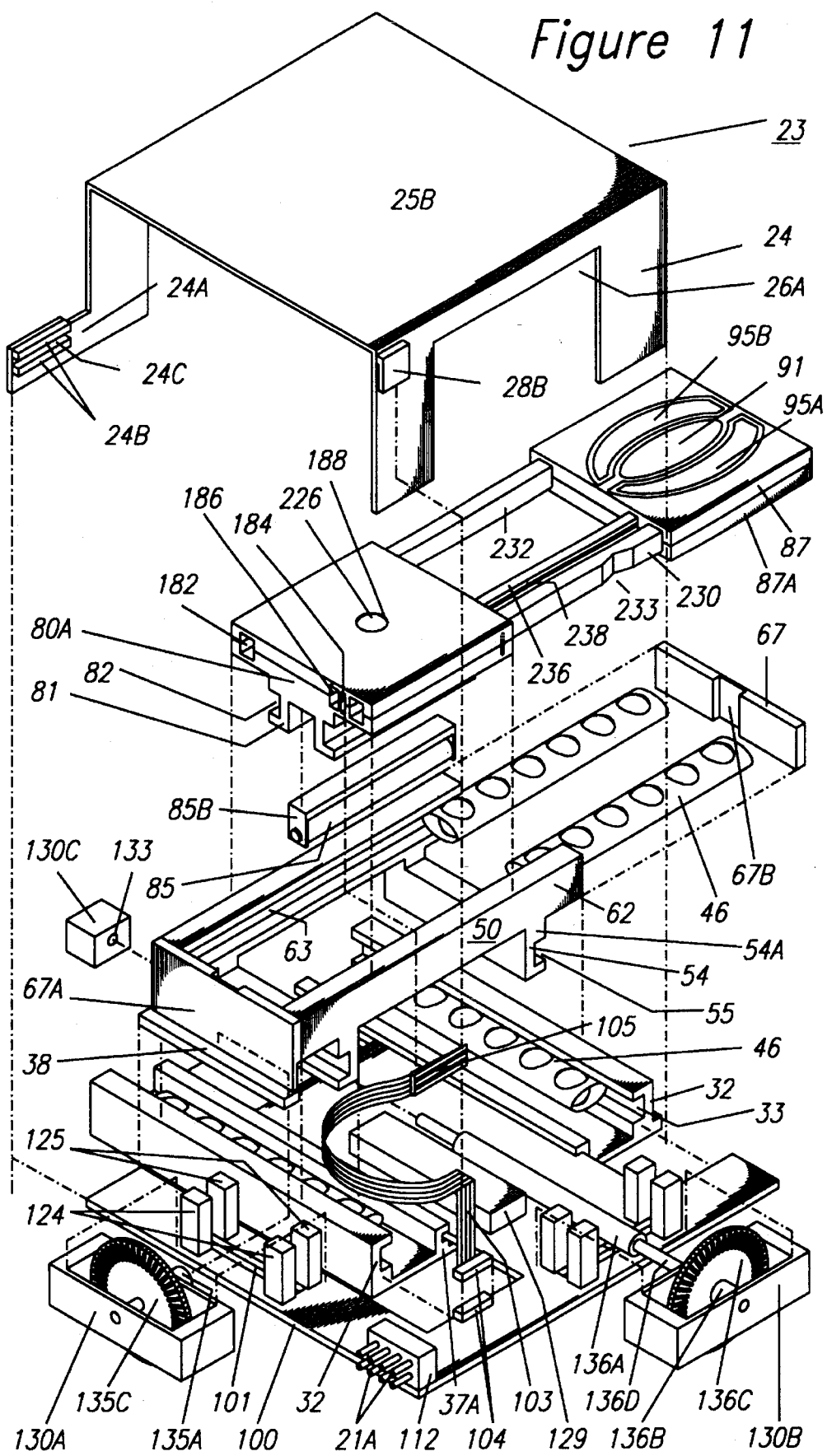
FIG. 11 is a left-rear partially exploded perspective view of the second alternative embodiment shown in FIGS. 3 and 4.

As shown in FIG. 3, the second alternative embodiment is developed as a miniature form of the pointing device 20, with features necessary to enable incorporation into a computer A and to be operated therein. Thus, the ability to be miniaturized and to be integrated into a computer are the objectives of this embodiment and are met by the following major modifications.

a. As shown in FIG. 11, the circuit board 100 and rotary encoder disk assemblies 135 and 136 are mounted to the base 30, not being mounted within the carriage 50 due to insufficient space.

b. The carriage 50 consists almost entirely of tracks 54 and 62 and moves along the X-axis in the manner described for the basic embodiment, but has neither a top nor a bottom enclosure.

c. The operation plate 87, containing the select buttons 95A and 95B, is mounted to pointer base 80A on horizontally slidable bars 230 and 232 and is directly in front of the pointer 80. This enables the operation plate 87 to be extended from the computer's case for use and to be retracted into the case for storage.

d. The Y-axis encoder operating rack 85 is cylindrical and rotatable, and is mounted underneath the pointer base 80A and oriented along the Y-axis. The rack 85 projects downward through the carriage 50 to reach an elongated roller 136A of the Y-axis encoder disk assembly 136. The roller 136A is parallel to the base tracks 32, and rotates against the rack 85 in response to Y-axis movement, but the cylindrical rack 85 rolls over the roller 136A longitudinally in response to X-axis movement, without causing the roller 136A to rotate.

e. The X-axis encoder disk assembly 135 is mounted aft of the rear track 32 and is operated by a rack 38 extending from the rear end of the carriage 50.

f. A case 23 partially encloses the device, but serves more as a means to support a top plate 25B that serves as a surface underneath which a stabilizing ball 226 rolls.

g. The main cable 110 is eliminated along with the connecting cable 21, which are replaced by pins 21A to connect internally with the computer's circuitry.

h. The switch connecting cable 103 is augmented by sliding conductors 238 to maintain electrical contact with select switches while the operation plate 87 is extended for use.

VC-2. Details of the 2nd Alt. Embodiment—FIGS. 3, 4, 11 & 11A 11B

The ensuing descriptions cover details of the structural and operational differences between the second alternative embodiment of the pointing device of the present invention compared to the basic embodiment as well as the first alternative embodiment.

VC-2a. The Outer Case of the 2nd Alt. Embodiment—FIG. 11

Best shown in FIG. 11, the outer case 23 comprises a substantially square top plate 25B and four partial walls 24 that adjoin each corner and are formed along the left and right sides, each extending toward the center to leave openings 26A on each side. The case 23 further includes an extension 24A at the right-rear side wall 24 that projects aft to a distance to be aligned with the rear extension of a F-shaped main circuit board 100, and has two inward facing bars 24B spaced to form a board support slot 24C there between. Further, the case 23 includes a cable retention clip 28B at the top of the left-rear partial side wall 24. The underside of the top plate 25B is smooth and is mounted aligned substantially parallel to the base plate 31 to support a stabilizer assembly 213 having a ball 226 that rolls underneath the top plate 25B during operation of the device.

VC-2b. The Stationary Base of the 2nd Alt. Embodiment—FIG. 11

The base 30 is similar to that in the first alternative embodiment, having tracks 32 into which inward facing U-shaped channels 33 are formed, but are parallel to the X-axis. The front track 32 is mounted inset from the front of the base plate 31 to allow a clearance at the front when mounted in the case B of a computer A. The thickness of the tracks 32 as well as the other tracks in this embodiment is increased to prevent deformation while supporting the operation plate 87 extended offset from the tracks. The base 30 also has two board mounting rails 37A, located inward and parallel to tracks 32. The rails 37A have inward facing slots into which a central section of the main board 100 is mounted and fixed above the base plate 31.

It is noted that the elliptical ball bearing retainer sleeves 48 are oriented such that the major axes are parallel to the X-Y plane like those of the basic embodiment, although the channels 33, 55, 63 and 82 are side-by-side as in the first alternative embodiment. This arrangement reduces vertical space and device height requirements, and is permitted since lateral space within the carriage 50 is sufficient in the absence other components.

VC-2c. The Carriage Assembly of the 2nd Alt. Embodiment—FIG. 11

Since no electrical components are housed in the carriage 50 and the Y-axis direction operating rack 85 must pass completely through the carriage 50 to reach the Y-axis encoder roller 136A, the carriage 50 consists almost entirely of tracks 54 and 62. The tracks 54 are shaped similarly to tracks 32 on the base 30, but face outward, the guide channels 55 also facing outward forming mirror image pairs with support channels 33. The two support tracks 62 form the sides of carriage 50 and extend beyond the outer edge of track 32 at the rear to provide a clearance for mounting a rack 38 at a distance from the track 32. A spacer 54A is formed between each area where tracks 62 intersect tracks 54 and vertically space the tracks sufficiently apart to enable all components moving along the Y-axis between tracks 62 to clear all parts of tracks 32 and 54 below. Rectangular track end caps 67 and 67A are mounted at the front and rear ends, respectively, of tracks 62 and extend across from one track 62 to the other. Each end cap 67 and 67A has a vertical inward facing clearance slot 67B into which the ends of a rack mounting fork 85B move while the pointer 80 is at the extremities of its field against the bumper caps 67 and 67A. The end cap 67A extends down vertically beyond and rearward of the top of track 32 and joins perpendicularly to the X-axis encoder operating rack 38, which projects rearward to contact the roller 135A from below.

VC-2d. The Pointer Assembly of the 2nd Alt. Embodiment—FIGS. 11A & 11B

Figure 11A:
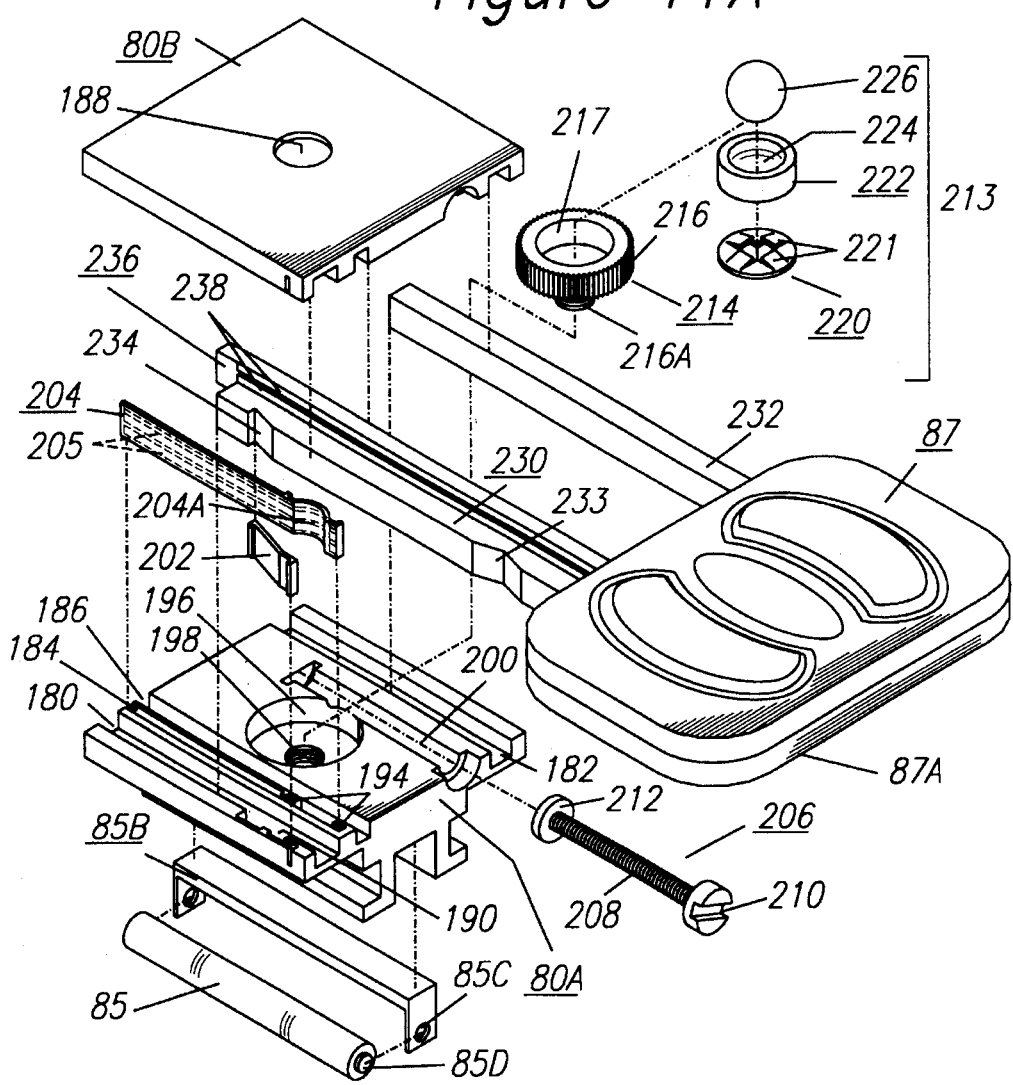
FIG. 11A is a left-front exploded perspective view of the pointer assembly of the second alternative embodiment shown in FIGS. 3, 4 and 11.

The pointer assembly 80 in this second alternative embodiment is shown in an exploded left-front perspective view in FIG. 11A. The pointer assembly 80 comprises a base 80A, which has a cover 80B between which components are located that relate to the extendable-retractable pointer operation plate 87 and the stabilizer assembly 213.

VC-2d(1) Pointer Base of the 2nd Alt. Embodiment—FIG. 11A

The pointer base assembly 80A has downward projecting tracks 81 similar to tracks 81A and 81B of the first alternative embodiment, and has similar guide channels 82, but are oriented along the Y-axis. FIG. 11A shows that a mounting fork 85B for the Y-axis encoder operating rack 85 is attached on the underside of the pointer base 80A and consists of a downward facing U-shaped member with bearings holes 85C at each end. The rack 85 is cylindrical and rotatable with short shafts 85D extending from the ends, and mounts into bearing holes 85C, thereby being positioned within the U-shaped fork 85B such that it rotates. The end members of the fork 85B are urged inward to eliminate axial movement of the rack 85, but allow the rack 85 to rotate without noticeable friction.

Various recessed structures formed into the top of pointer base 80A continue as mirror images into the cover 80B, where enclosed parts extend into both the base 80A and cover 80B. Rectangular mounting slots 180 and 182 are formed along the Y-axis at a distance from the left and right sides, respectively, across the extent of the base 80A. The left slot 180 has a section widened toward the outer side and near the front of the base 80A to form a chamber 190 for mounting a retainer leaf spring 202. The outer boundary of the chamber 190 is generally E-shaped, and has a ridge near the center and a narrow portion that extends forward between the channel 180 and the left side and bends outward to the left edge of the base 80A near the front. This narrow section tightly mounts the forward end of the leaf spring 202 which has a 90 degree bend.

A groove 184 is formed immediately right of slot 180, extending from the rear of the base 80A to a distance near the front and terminating as a wider chamber 194 projecting to the right and joining a slide conductor channel 186 that extends from the front to the rear of the base 80A. The chamber 194 has two small enclosing areas at the front and rear ends that are open on the left sides and shaped to accommodate a head 204A of an internal conductor 204. The conductor 204 and the head 204A have three conductor strips 205 aligned vertically on the right side. The head 204A joins the bar 204 at a rightward facing ridge then consisting of a resilient arc projecting rightward and terminating with a 90 degree bend to the right, the ridge and the bent end being engaged and held within the small areas at each end of the chamber 194. A sliding conductor bar 236 is positioned in the channel 186 and has three leftward facing vertically aligned conductor strips 238 that are connected to switch elements in the pointer operation plate 87, and are held in electrical contact with strips 205 on the internal conductor 204 by the resiliently arched head 204A. Internal conductor 204 connects to a wedge-shaped connector 105 at the end of switch connecting cable 103. It is noted that the sliding conductor bar 236 and channel 186 can be eliminated, and similar conductors can be incorporated into the right side of the left mounting bar 230, requiring the chamber 194 to be oriented toward and opened into groove 180.

VC-2d(2) Stabilizer Assembly of the 2nd Alt. Embodiment—FIG. 11A

As shown in FIG. 11A, the pointer base plate 80A and cover 80B of this second alternative embodiment further include a circular chamber 196 formed vertically, sized to accommodate a stabilizer assembly base 214, and having a threaded mounting hole 198 located at the bottom. The chamber 196 intercepts a cylindrical chamber 200 that is elongated parallel to the Y-axis and extends from the front edge of the base 80A, terminating at a distance from the rear edge. The chamber 200 is shaped to accommodate a tension adjustment screw 206, that has a central threaded shaft 208 with an enlarged head containing a screwdriver operatable slot 210 at the front and an enlarged retention flange 212 at the opposite end. The front and rear ends of the chamber 200 are enlarged to accommodate these enlarged sections of the screw 206.

The stabilizer assembly base 214 is a circular sleeve that is enclosed at the bottom and has a threaded mounting shaft 216A extending from the bottom that mates into threaded hole 198, and having a circular top opening 217. The outer wall 216 of base 214 effectively forms a worm wheel that is rotated by the threads in screw 206 which together form a worm gear mechanism and is operated with a screwdriver. Rotation of the base 214 causes the mounting shaft 216A to adjust vertically in the threaded hole 198, thereby providing a tension adjustment means for the stabilizer ball 226. The ball 226 extends through a circular hole 188 in the pointer base cover 80B, and fits within a hemispherical socket opening 224 that is formed into the top of the circular socket body 222. The socket 222 is mounted in the opening 217 of stabilizer base 216 and fits upon a tensioning spring device 220 that has a plurality of spring tabs 221. The ball 226 maintains frictional contact with the ceiling of top cover plate 25B against which it is held by tension spring 220, and provides adjustable frictional drag in the movement of the pointer 80. The stabilizer ball 226 also prevents tilting of the pointer 80 or the carriage 50 against the stationary base 30 due to downward force upon the offset operation plate 87 during use.

VC-2d(3) Operation Plate of the 2nd Alt. Embodiment—FIG. 11A

Figure 11B:
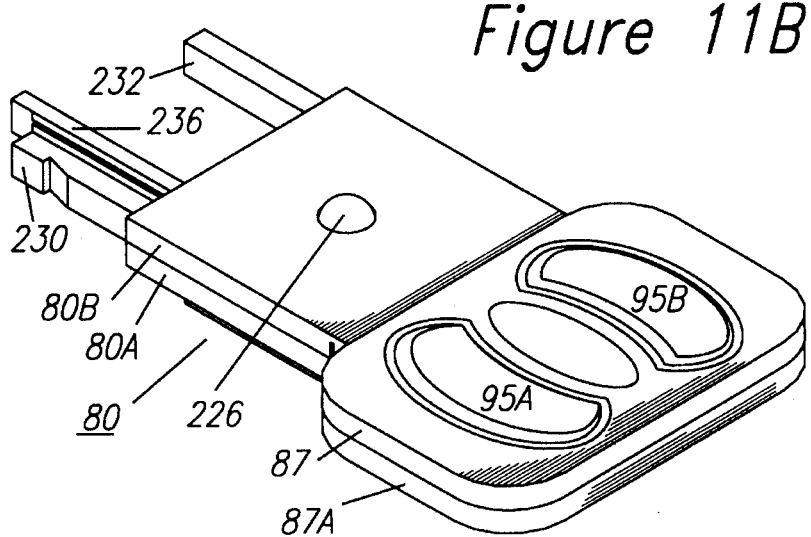
FIG. 11B is a left-front perspective view of the pointer assembly of the second alternative embodiment shown in FIGS. 3, 4, 11 and 11A, with the operation plate in the retracted position.

The pointer operation plate 87 of this second alternative embodiment is positioned directly to the front of the pointer base assembly 80A and cover 80B, being mounted on slidable bars 230 and 232 that fit into slots 180 and 182 formed in the pointer base 80A and cover 80B. As best shown in FIGS. 3 and 4, the operation plate 87 is centered in the extended position for use and is clear of the outer case 23 and the case B of the computer A. FIG. 11B shows the operation plate 87 in the retracted position adjacent the pointer base 80A, the slidable mounting bars 230 and 232 projecting to the rear of the pointer base 80A. The pointer operation plate 87 along with an operation plate base 87A house the select buttons 95A and 95B, and associated circuit board 160 and switch elements common to that of the first alternative embodiment shown in FIG. 8A.

As shown in FIG. 11A, the free end of the retention spring 202 is shaped to engage into a notch 234 when the operation plate is pulled to the extended position, the steep rear edge of the notch 234 lodging against the spring 202 prevents inadvertent withdrawal of the mounting bar 230. The gradual sloping side of the notch 234 fits the form of the spring 202 and locks the mounting bar 230 into the extended position for use, but is released from the spring 202 in response to additional rearward force while the pointer 80 is positioned completely to the rear. A second notch 233, being V-shaped allows easy engagement and disengagement by the spring 202 while sufficiently locking the mounting bar 230 in the retracted position.

The outer side of the mounting groove 180 is widened towards the left from the front to the spring mounting chamber 190, where a narrow instrument such as the shaft of a paper clip can be inserted left of the bar 230 and pushed backward to disengage the spring 202 such that the mounting bars 230 and 232 can be withdrawn with the operation plate 87 and removed as a unit. This accommodates the exchange of operation plate assemblies 87 designed to meet different needs.

VC-2e. Main Circuit Board of the 2nd Alt. Embodiment—FIG. 11

The circuit board 100 of this embodiment is shown in FIG. 11 and is F-shaped, the lower bar representing the wide central section that mounts between the tracks 32 into mounting rails 37A, the top section being narrower extends across the rear parallel to the rear track 32 with a clearance between the two and is supported at the outer end by slot 24C in the case 23. The vertical part of the F-shape connects the two sections and extends across the left beyond the base 30 and case 23.

VC-2e(1) Encoders of the 2nd Alt. Embodiment—FIG. 11

The encoder disks are mounted in separate support blocks, the X-axis encoder disk assembly 135 being mounted at the rear in a block 130A. The roller 135A is positioned on the top side of the rack 38 mounted to the rear of carriage 50 centered with respect to carriage movement. The Y-axis encoder disk assembly 136 is mounted on the section of the board connecting the two parallel sections, and is supported by a block 130B that encloses the photo emitters 124 and photo receivers 125. An additional block 130C supports the shaft 136D at the right end of the long roller 136A. The roller 136A is located at the center with respect to the movement of the pointer base 80A along the Y-axis, the upper surface of the roller 136A being at a Z-axis level sufficiently midway the spacer 54A between tracks 54 and 62. The Y-axis operating rack 85 projects down to this level as well, thus remaining clear of the upper parts of tracks 54 and 32. Racks 38 and 85 are slightly longer than the X and Y strokes to maintain adequate contact with encoder rollers 135A and 136A at the limits of rack movement. It is important to connect each pair of leads from the photo receivers 125 to the microprocessor 129 such that, in reference to mouse and trackball devices, they are exchanged in the case of the Y-axis pair because the Y-axis encoder shaft 136D, as viewed from the top, rotates in the direction of device movement. However, unlike the other embodiments, the shaft 135D of the X-axis encoder rotates in the reverse direction of carriage 50 movement because it is driven from below by rack 38. Therefore, the output leads of the pair of photo receiver 125 for X-axis movement are connected as in a conventional mouse or trackball device.

VC-2e(2). Other Electrical Parts-2nd Alt. Embodiment—FIG. 11

Other electrical components and features of this embodiment are common to other embodiments, except that no main flexible cable is required, where components on the board 100 internally communicate with the computer via the pins 21A in the connector 112 (FIG. 11). The switch connecting cable 103 is simplified, connected to the board 100 near the left-rear wall segment extending upward and secured by clip 28B near the right-rear upper corner of the wall 24. The active section of the cable 103 is oriented on edge to easily bend during operation, and begins at the clip 28B and extends to the terminal 105 that connects to the internal connector 204 in slot 184 formed in the pointer base 80A and cover 80B. The length of this section is approximately 1.2 times the minimum distance required to connect to the pointer 80 when the pointer 80 is at the right-front extent of the active area.

VC-2f. Operational Features of the 2nd Alt. Embodiment

This second alternative embodiment is developed to be easily miniaturized. For example, a typical construct of this embodiment has an active area of 2.54 by 2.54 centimeters (1 inches square), all supporting tracks 32 and 62 being 5.08 centimeters (2 inches) in length and the pointer base 80A being one-half this length. Using encoders and shafts with dimensions as those given in previous examples, the 320 count per centimeter resolution will provide 815 counts over the range of pointer movement along each axis direction. The resolution and count productivity can be easily doubled by reducing the driven sections of the 1.58 millimeter shafts 135D and 136D to 0.8 millimeters in diameter.

VC-2g. Other Variations of the Second Alternative Embodiment

The large number of parts required to implement the additional features, specifically the extendable-retractable operation plate 87, the stabilizer ball 226 and the case 23 can be eliminated. Then, the pointer operation plate 87 can be placed directly on the pointer base 80A as in the first alternative embodiment, to result in a device that is still compact and can be integrated into a computer or attached thereto. This constitutes a further variant that is simple and easy to assemble.

Features described for this embodiment are not restrained to a small device. As an example, the off-carriage encoder feature permits a low profile and simpler cable handling, and can be applied to larger sizes as well. Also, the idea of an operation plate 87 being separated from the pointer base 80A can be used in the basic embodiment, such that a large operation plate can be fixed upward from the pointer base on a narrow neck extending through a smaller opening 26 (FIG. 5) in case 23 and positioned to lightly slide upon the top flanges 25 and 25A during operation to provide frictional dampening as well as a cover over the movement mechanism.

V-D. DESCRIPTION OF THE ACCESSORY DEVICES

Inventive accessories are developed to enhance the versatility of the pointing device 20 of the present invention and to meet special needs. The ensuing description and drawings (FIGS. 12A–12G) disclose the structural and operational characteristics of these accessory devices.

VD-1. The Accessory Flexible Dust Cover—FIG. 12A

FIG. 12A shows an accessory flexible dust cover attachment 250 of the present invention fitted on the first alternative embodiment of the pointing device 20. The dust cover 250 comprises a perimeter wall 252 that is of a rigid material and which mounts to the stationary base 30 at the front and rear ends of the pointing device 20 by suitable means (not shown), the sides being positioned away from the carriage 50 which moves during operation. The dust cover 250 also includes a rectangular rigid base plate 254 that is significantly larger than the operation plate 87. Plate 254 has a rectangular opening 256 in the center that is substantially large to permit access to the select buttons 95, but substantially small to fit within the borders of the accessory mounting holes 90 (FIG. 8) formed in the operation plate 87. A plurality of mounting pegs 258 are formed on the underside of plate 254 and are aligned to mate with mounting holes 90 formed in the operation plate 87.

The main part of the dust cover 250 is a flexible canopy 260 which can be constructed of a woven material such as that used in construction of lightweight garments. The canopy 260 has seams 262 not only serving to join edges of the fabric together, but to provide some resistance to bending to give the canopy 260 a fluffy appearance and to help keep the canopy away from moving parts such that the pointing device 20 can be used while the cover is fitted. Alternatively, the canopy 260 can have expansion pleats similar to bellows, and may be decorative. The canopy 260 is attached to the plate 254 and has an opening that surrounds the opening 256, and extends laterally and loosely over the top of the perimeter wall 252 and attaches to the bottom section of the wall 252.

D-2. Accessory Tracing Attachment Device—FIG. 12B

An accessory tracing attachment device 330 of the present invention is shown in an exploded perspective view in FIG. 12B. It comprises a base mounting plate 332, a boom 346, a penholder 354 and a plunger 339. The tracing device 330 functions as a digitizer and uses a pen or pencil as the pointer to be moved over a work surface offset from the pointing device 20.

VD-2a. Boom Mounting and Boom

The base mounting plate 332 is sufficiently elongated to span the operation plate 87 of the pointing device 20 and has two accessory mounting pegs 258 spaced to mate with accessory mounting holes 90 on two opposing sides of the operation plate 87. The base plate 332 further includes an opening 333 sufficiently large and positioned to allow a shaft 341 of the plunger 339 to pass through without frictional contact. A boom mount 336 is substantially the length of and is aligned over the base plate 332. The boom mount 336 is attached to the base plate 332 by a resilient spacer hinge 334 at the end near the opening 333, and further has a threaded hole 338 aligned over the larger hole 333 in the base plate 332. The boom mount 336 also has a rectangular slot 337 formed longitudinally from the end opposite the end nearest the hole 338, and is sized to tightly accommodate one end of the boom 346.

VD-2b. Select Button Operating Plunger—FIG. 12B

The select button activation plunger 339 comprises the threaded shaft 341 that is blunt at one end and having a knurled knob 340 at the other end. The threaded shaft 341 is fitted through a knurled locknut 342 having a hole 343 with mating threads; and is mounted into the threaded hole 338 in the boom holder 336 to a depth where the select button 95 will be depressed when the boom holder 336 is moved downward. The locknut 342 is tightened to retain the plunger in the desired position.

The boom 346 is sufficiently long to position the pen (not shown) in the penholder 362 at a location sufficiently offset from the device to permit necessary movement over an object to be traced. A longitudinal rib 348 is formed on the top side of the boom 346 to reduce bending and to ensure the select button 95, being operated by the plunger 339, remains depressed during operation with the pen or pencil down on the object to be traced.

VD-2c. Operation Head and Pen Holder—FIG. 12B

An operation head 350 having an elongated section with a longitudinal boom mounting hole 351 in one end is fitted to the end of the boom 346 that is opposite the end fitted in the boom mount 336. The head 350 further has an enlarged opposite end, then terminating as a smaller cylindrical stud 352, which is fitted tightly into a hole 355 in the outer end of the penholder 354. The penholder 354 can be adjusted for tilt with respect to the longitudinal axis of the boom by rotation of the hole 355 about the stud 352.

The penholder 354 further includes the pen receptacle 356 that is a cylindrical cavity formed perpendicularly to the mounting hole 355 at the opposite end and is formed in part by the semicircular notch 357 that is complemented by three semicircular clips. Two semicircular clips are attached to the rear side, one at the top 358 and the other at the bottom 360 that extend clockwise and terminating to nearly complete a circle with the semicircular notch 357 and each having a release tab 359 and 363 near the ends. A third semicircular clip 362 is formed at the front side of the semicircular notch 357 at the vertical center and extends counterclockwise between the clips 358 and 360, terminating near the back of the semicircular notch 357 and also having a release tab 361 near the end. The release tabs 359 and 363 on the front are squeezed toward tab 361 to cause expansion of the receptacle 356, thus, allowing pencils and pens to be fitted, adjusted and removed.

VD-2d. Operation of the Tracing Device—FIG. 12B

Objects to be traced or sketch pads are placed upon a flat level surface near the pointing device 20 which is also placed upon the same surface. A pen or pencil is mounted in the receptacle 356 and adjusted vertically upon the object such that the select button activation plunger 339 can be adjusted to depress the select button 95 when the pen is pressed downward upon the object and deactivated when the pen or pencil is raised. As the pen or pencil is moved upon the object, the pointer 80 tracks the movement of the pen or pencil and causes the cursor to track the movement of the pointer 80.

VD-3. Accessory Brake Attachment Device—FIG. 12C

A left-rear exploded perspective view of an accessory brake attachment device 270 is shown in FIG. 12C. The brake device 270 is developed to induce and regulate a frictional force between the movable pointer 80 and the stationary base plate 31. When a light force of substantially the magnitude used during writing is applied, small incremental movement and restraint during button depression of the pointing device 20 are facilitated. The brake device 270 is also shown in FIG. 12E, along with two accessory pen-like control knob attachment devices 280 mounted to the first alternative embodiment of the pointing device 20.

The brake device 270 comprises a base mounting plate 272 having two mounting pegs 258, and a resilient spacer hinge 274 similar to the plate 332 and the hinge 334 of the tracing attachment 330 described earlier and shown in FIG. 12B, except that the through hole 333 is not required.

The brake device 270 further includes an activation arm 276 that is substantially the width of the plate 272, both being substantially narrow to fit upon the operation plate 87 of the pointing device 20 such that both extend to no more than 5 millimeters from inside of the centerline of each select button 95. The activation arm 276 is joined to the hinge 274 at the rear and extends to a location exceeding the length of the plate 272 and over the front of the operation plate 87 of the pointing device 20, there joining perpendicularly to the top of a shank 278 located to be near but free of the front surfaces 62 and 51B of the carriage 50. The shank 278 is tapered near the bottom end and is terminated as a rounded friction pad 279, which projects to within a close proximity of the top of the base plate 31 when not activated.

VD-3a. Operation of Brake Device—FIG. 12C

The brake device 270 as described, is only mountable on the first alternative embodiment of the pointing device 20, where the mounting pegs are fitted into the front and rear center accessory mounting holes 90 on the operation plate 87 and is oriented with the shank 278 and friction pad 279 extending over the front of the pointing device 20 (FIG. 12E). When used alone, a finger is placed upon the activation plate 276 which is pressed downward slightly until the friction pad 279 contacts the base plate 31 and the desired drag is obtained. FIGS. 12E and 12G show that the brake device 270 can be used with and activated by other accessories of this invention.

VD-4. Accessory Pen-like Control Knob Attachment Device—FIG. 12D

The accessory pen-like control knob attachment device 280 provides an alternative means of operating the pointing device 20 and is shown in an exploded perspective view in FIG. 12D. Further, two of the pen-like controls 280 are shown in FIG. 12E attached simultaneously with the brake device 270.

The pen-like control 280 comprises a base mounting plate 282, a resilient hinge 284, an activation plate 286, a pen handle 290 and a locknut 292. The base plate 282 is very similar to the plate 272, but has three mounting pegs 258 formed underneath, and has a width extending from the edge of the operation plate 87 to a point not to exceed 5 millimeters outside of the centerline of select buttons 95.

The activation plate 286 is mounted perpendicularly at the center and flush to the outside of the base plate 282, and joined to the base plate 282 by a resilient hinge 284 that also serves as a spacer. The activation plate 286 further includes a rectangular notch 288 on the underside at the inner end and is positioned to fit over the activation arm 276 of the brake device 270 when mounted concurrently. A threaded hole 287 is formed at a location aligned near the centerline of the select button 95 on the side of the pointing device 20 to which the pen-like control 280 is mounted.

The pen handle 290 comprises a threaded shaft 293 that increases in diameter upward from the threads, thus being conic, plus having a rounded end. The threaded end 291 is fitted through a knurled locknut 292 having mating threads 293 and mounts into the threaded hole 287 of the activation plate 286, being poised upon the respective select button 95 when in use.

VD-4a. Operation of Pen-Like Control Knob Device—FIGS. 12D & 12E

The pen-like control knob 280 allows the user to operate the pointing device 20 by holding a pen-like knob 290 that is used to position the pointer 80 and to operate the select button 95 on the side that the pen-like knob device 280 is mounted. Since the pen-like knob 290 serves as a plunger for operating one of the select buttons 95, the extent of the threaded portion 291 below the activation plate 286 is adjusted by turning the knob 290, then fixing the setting by tightening the locknut 292. Two pen-like knob devices 280 can be used simultaneously where both select buttons 95 can be operated, each by one of the devices.

When used simultaneously with the brake device 270 the brake device 270 is installed before the pen-like knob device 280 since the notch 288 under the activation plate 286 fits over the activation arm 276 of the brake device 270. The maximum braking friction is set by turning the pen-like knob 290 to adjust the reach of the threaded shaft 291 to a point where the select button 95 is activated only after the desired frictional drag is applied by downward movement of the activation plate 286 that applies a force upon the activation arm 276 of the brake device 270, both being operated and regulated by downward movement of the pen-like knob 290.

VD-5. Accessory Mouse-Like Operation Knob Attachment Device—FIGS. 12F & 12G

FIG. 12F shows a left-front perspective view of the accessory mouse-like operation knob attachment device 300 of the present invention. As shown in FIG. 12G in a left-front perspective view, the mouse-like knob device 300 is mounted to the pointer operation plate 87 of the pointing device 20, and can be simultaneously mounted and used with the brake device 270.

The mouse-like knob 300 comprises two mounting base plates 302, a top cover 304, two side walls 310 and two remote select buttons 314. The base plates 302 extend the length of the pointer operation plate 87 of the pointing device 20 and one each being mounted at the left and right sides fitted by engaging accessory mounting pegs 258 (not shown) on the bottom of the base plates 302 to the outer rows of accessory mounting holes 90 in the operation plate 87. The plates 302 are spaced to form a clearance slot 308 at the center that accommodates the operation of the brake device 270 when mounted simultaneously.

Sized for operation by the thumb and several other fingers, the top cover 304 is formed as flat sections with angular intersections, orientated along the X-axis to improve grip, and extends from the front and arching up to a flat center and continuing downward to the rear joining the base plates 302. A remote select button opening 306 is formed on each side, beginning near the rear edge and extending forward over approximately two-thirds of the top surface. Enclosure of the device is completed by side walls 310 each having a clearance slot 312. The cover is completed underneath by the plates 302.

The interior of the device contains resilient remote button mounts 316 which are joined to the base plates 302 near the front and arch upward and toward the rear being joined to the remote select buttons 314 underneath the top cover 304 near the center. Select buttons 95 on the pointing device 20 are operated by button activation plungers 318 attached underneath the remote select buttons 314. The plungers 318 extend vertically down through holes in the base plates 302, similar to hole 333 and have threads near the ends similar to shaft 341 (FIG. 12B). An activation disk 320 having a knurled outer edge and a threaded center mounting hole 322 is fitted onto each plunger 318. The disk 320 operates the brake device 270 in the same manner as the activation plate 286 in the pen-like control device 280. Frictional drag is adjusted by rotation of the disks 320 at the edges extending through the slots 312. The threads 322 and the mating threads on plungers 318 are close fitting, where no locknuts are needed to fix the adjustment. Alternatively, two disks may be mounted on each plunger and can be tightened one against the other to serve as locknuts.

Whereas the device shown is sized to be operated with several fingers, the mouse-like operating knob attachment device 300 may be expanded into a full palm-sized house housing.

V-E. CONCLUSIONS, RAMIFICATIONS AND SCOPE

VE-1. Conclusions

The foregoing descriptions of three embodiments of the pointing device of the present invention and of five accessory attachment devices disclose a versatile system which incorporates many selected advantages and capabilities of certain prior art pointing devices while precluding the disadvantages. These advantages include the precise maneuverability, high resolution and absolute mapping capabilities of a pen operated digitizer while being as compact and easy to set up as a trackball. These achievements are due to the compact unitized construction made possible by the low friction, omnidirectional, uniplanar movement mechanism supporting the rectangular operation plate. In terms of versatility, the pointing device can be fully operated with even a single finger, by a pen or pencil engaged upon its surfaces or mounted in a receptacle ready for use therein, by a built-in retractable knob, with accessory pen-like knobs, with an accessory mouse-like knob, or with a pen or pencil mounted offset from the pointing device for use as a digitizer. Further the pointing device is easy to manufacture, using electrical circuitry and operational software common to ball-operated prior art pointing devices.

VE-2. Ramifications and Scope

While the above descriptions contain many specificities, these should not be construed as limitations on the scope of the invention, but rather as exemplification of three embodiments and five accessory devices thereof. Many of the different features combined in the descriptions of any of the embodiments may be individually substituted to form other variations.

Accordingly, the scope of the invention should be determined not by the embodiments and accessory devices illustrated, but by the appended claims and their legal equivalents.

TABLE 1

Reference Numbers and Corresponding Part Names Used Drawings.

[1]Part Name Used in Descriptions of the Three Embodiments

| [2]Reference Number | Basic Embodiment | First Alternative Embodiment | Second Alternative Embodiment |
|---|---|---|---|
| A | Computer | same | same |
| B | case | same | same |
| C | N/A | N/A | case access opening |
| D | keyboard | same | same |
| E | display screen | same | same |
| F | screen cursor | same | same |
| X | X-axis direction indicator arrows | same | same |
| Y | Y-axis direction indicator arrows | same | same |
| 20 | Pointing device | same | same |
| 21 | External connecting cable | same | |
| 21A | N/A | N/A | connecting pins |
| 23 | Outer case assembly | N/A | same |
| 24 | case perimeter wall | N/A | same |
| 24A | N/A | N/A | support wall extension |
| 24B | N/A | N/A | board support bars |
| 24C | N/A | N/A | board support slot |
| 25 | case top flange | N/A | N/A |
| 25A | main flexible cable well top cover | same | N/A |
| 25B | N/A | N/A | case roof |
| | N/A | N/A | case ceiling |
| 26 | operation top access opening | N/A | (25A instead) |
| 26A | N/A | N/A | wall access openings |
| 27A | mounting spacer bar, front | N/A | N/A |
| 27B | main flexible cable well floor | N/A | N/A |
| 27C | mounting spacer bar, rear | N/A | N/A |
| 28 | main flexible cable well cavity | same | N/A |
| 28A | main flexible cable clip, first | same | N/A |
| 28B | N/A | same | switch cable clip |
| 28C | main flexible cable contact area, stationary | same | N/A |
| 28D | main flexible cable clip, second | same | N/A |
| 29 | external cable access hole | same | N/A |

TABLE 1-continued

Reference Numbers and Corresponding Part Names Used Drawings.

[1]Part Name Used in Descriptions of the Three Embodiments

| [2]Reference Number | Basic Embodiment | First Alternative Embodiment | Second Alternative Embodiment |
|---|---|---|---|
| 29A | external cable access door | N/A | N/A |
| 30 | Stationary base assembly | same | same |
| 31 | base plate | same | same |
| 32 | support tracks | same | same |
| 32A | N/A | cover flange | same |
| 33 | support channels | same | same |
| 33A | channel outer edge | upper edge | upper edge |
| 33B | channel inner edge | lower edge | lower edge |
| 33C | channel bottom | same | same |
| 34 | carriage retainer grooves | N/A | N/A |
| 35 | track bumper caps | (35A & 35B instead) | (24 instead) |
| 35A | N/A | front base wall | N/A |
| 35B | N/A | rear base wall | N/A |
| 37 | encoder operating rack mounting rail | N/A | (67A instead) |
| 37A | N/A | N/A | board mounting rail |
| 38 | encoder operating rack | (32A instead) | same |
| 39 | Main flexible cable guide | same | N/A |
| 39B | cable guide inner wall | same | N/A |
| 39B | flexible cable guide plate | (inverted) | N/A |
| 39C | N/A | outer wall | N/A |
| 39D | N/A | front wall | N/A |
| 39E | N/A | rear partial wall | N/A |
| 39F | N/A | wall opening | N/A |
| 40 | cable exit slot | (opening) | N/A |
| 41 | cable clip | same | N/A |
| 46 | Guide bearing assemblies | same | same |
| 47 | ball bearings | same | same |
| 48 | ball bearing retainers | same | same |
| 49 | ball bearing sockets | same | same |
| 50 | Carriage assembly | same | same |
| 51 | carriage body assembly | same | (65C instead) |
| 51A | body side walls | (54 instead) | N/A |
| 51B | body end walls | same | (54 instead) |
| 51C | body floor | same | N/A |
| 53 | encoder shaft access slot | (located in 54A) | N/A |
| 54 | guide track assembly | same | same |
| 54A | N/A | extension end flanges | N/A |
| 54B | N/A | N/A | track spacer |
| 55 | guide channels | same | same |
| 55A | channel outer edge | upper edge | upper edge |
| 55B | channel inner edge | lower edge | lower edge |
| 55C | channel bottom | same | same |
| 59 | retainer rail assembly | N/A | N/A |
| 59A | side plate | N/A | N/A |
| 59B | retainer flange | N/A | N/A |
| 61 | carriage top cover assembly | same | (65C instead) |
| 61A | roof section | same | N/A |

TABLE 1-continued

Reference Numbers and
Corresponding Part Names Used Drawings.

[1]Part Name Used in
Descriptions of the Three Embodiments

| [2]Reference Number | Basic Embodiment | First Alternative Embodiment | Second Alternative Embodiment |
| --- | --- | --- | --- |
| 61B | side walls | (and 67) | (62 instead) |
| 61C | end walls | (62 instead) | (67A & 67B) |
| 62 | guide track assembly | (also 61C) | (also 61B) |
| 62A | N/A | cover flange | same |
| 63 | guide track channels | same | same |
| 63A | channel outer edge | upper edge | upper edge |
| 63B | channel inner edge | lower edge | lower edge |
| 63C | channel bottom | same | same |
| 64 | encoder shaft access slot | (65A instead) | 65C |
| 65 | switch connecting cable well slot | (65B instead) | 65C |
| 65A | N/A | front pointer track access slot | N/A |
| 65B | N/A | rear pointer track access slot | N/A |
| 65C | N/A | N/A | inter-track space |
| 66 | pointer retainer groove | N/A | N/A |
| 67 | track bumper caps | (and 67A) | front bumper cap |
| 67A | N/A | N/A | rear bumper cap |
| 67B | N/A | N/A | rack clearance slot |
| 80 | Pointer assembly | same | same |
| 80A | pointer base assembly | same | same |
| 80B | N/A | N/A | base cover |
| 81 | pointer guide tracks | same | same |
| 81A | (Note 3) | front guide track | (Note 3) |
| 81B | (Note 3) | rear guide track | (Note 3) |
| 82 | pointer guide channels | same | same |
| 82A | outer channel edge | lower edge | lower edge |
| 82B | inner channel edge | upper edge | upper edge |
| 82C | channel bottom | same | same |
| 83 | inside recess | same | N/A |
| 83A | underside clearance recess | N/A | N/A |
| 84 | switch connecting cable access opening | same | same |
| 84A | switch connecting cable moveable platform area | same | N/A |
| 84B | N/A | cable retainer clip | N/A |
| 85 | encoder operating rack | (81A instead) | (rotatable) |
| 85A | encoder operating rack mounting groove | N/A | (85B instead) |
| 85B | N/A | N/A | rack mounting fork |
| 85C | N/A | N/A | rack shaft bearing hole |
| 85D | N/A | N/A | rack shaft |
| 86 | retainer rail assembly | N/A | N/A |
| 86A | retainer rail support plate | N/A | N/A |
| 86B | retainer rail flange | N/A | N/A |
| 87 | Pointer operation plate | same | same |
| 87A | N/A | N/A | operation plate base |
| 88 | circular opening | N/A | N/A |
| 89A | left select button opening | same | same |
| 89B | right select button opening | same | same |
| 90 | accessory mounting holes | same | N/A |
| 91 | operation assist recesses | same | same |
| 91A | primary recess | same | same |
| 91B | secondary recess | same | same |
| 92 | button retainer hinge channels | N/A | N/A |
| 93 | operation plate side skirt | N/A | N/A |
| 94 | operation plate mounting tabs | N/A | N/A |
| 95 | select buttons | same | same |
| 95A | left select button | same | same |
| 95B | right select button | same | same |
| 96 | button multi-way retainer hinges | N/A | N/A |
| 96A | hinge ridges | N/A | N/A |
| 97 | button retainer pegs | N/A | N/A |
| 100 | Main circuit board | same | same |
| 101 | encoder disk clearance slots | same | same |
| 103 | switch connecting cable | same | same |
| 104 | switch connecting cable main terminal | same | same |
| 105 | switch connecting cable upper terminal | same | same |
| 106 | switch connecting cable contact area, stationary | same | N/A |
| 110 | main flexible connecting cable | same | N/A |
| 111 | main flexible cable terminal | same | N/A |
| 112 | cable converter | same | same |
| 116 | Inter-board conductors | (cable) | N/A |
| 116A | N/A | lower connector | N/A |
| 116B | N/A | upper connector | N/A |
| 116C | N/A | sub-board connector | N/A |
| 120 | Supplementary circuit board | same | N/A |
| 121 | N/A | clearance slots | N/A |
| 123 | encoder support block mounting holes | same | same |
| 124 | photo emitters | same | same |
| 125 | optical receivers | same | same |
| 129 | Microprocessor | same | same |
| 130 | Encoder support blocks | same | same |
| 130A | X-encoder support block | same | same |
| 130B | Y-encoder support block | same | same |

TABLE 1-continued

Reference Numbers and Corresponding Part Names Used Drawings.

¹Part Name Used in Descriptions of the Three Embodiments

| ²Reference Number | Basic Embodiment | First Alternative Embodiment | Second Alternative Embodiment |
|---|---|---|---|
| 130C | N/A | N/A | Y-encoder supplemental support block |
| 131 | support block walls | same | same |
| 132 | support block wells | same | same |
| 133 | encoder shaft bearing holes | same | same |
| 134 | mounting holes | same | same |
| 135 | X-axis encoder disk assembly | same | same |
| 135A | encoder operation roller | same | same |
| 135B | encoder hub | same | same |
| 135C | encoder disc | same | same |
| 135D | encoder shaft | same | same |
| 136 | Y-axis encoder disk assembly | same | same |
| 136A | encoder operation roller | same | (elongated) |
| 136B | encoder hub | same | same |
| 136C | encoder disc | same | same |
| 136D | encoder shaft | same | (elongated) |
| 160 | Pointer circuit board | same | same |
| 161 | connector contacts | same | same |
| 162 | circular opening | N/A | N/A |
| 163 | Retractable knob mounting sleeve | N/A | N/A |
| 163A | flange | N/A | N/A |
| 163B | bottom | N/A | N/A |
| 163C | threads | N/A | N/A |
| 164 | Retractable operation knob | N/A | N/A |
| 164A | Pencil mounting hole | N/A | N/A |
| 164B | knob threads | N/A | N/A |
| 164C | screw operation slots | N/A | N/A |
| 165 | Left select micro switch | (170-172 instead) | (170-172 instead) |
| 165A | switch activation plunger | N/A | N/A |
| 166 | Right select micro switch | (170-172 instead) | (170-172 instead) |
| 166A | switch activation plunger | N/A | N/A |
| 170 | N/A | select button switch contacts | same |
| 170A | N/A | left active contact | same |
| 170B | N/A | right active contact | same |
| 171 | | active contacts | same |
| 171A | N/A | outer contact tabs | same |
| 171B | N/A | inner contact tabs | |
| 172 | N/A | stationary contacts | same |
| 172A | N/A | left surface | same |
| 172B | N/A | right surface | same |
| 172C | N/A | common surface | same |

Following additional parts pertain to the retractable pointer plate of second alternative embodiment.

| ²Reference Number | Basic Embodiment | First Alternative Embodiment | Second Alternative Embodiment |
|---|---|---|---|
| 180 | N/A | N/A | retractable pointer plate |
| 182 | N/A | N/A | retractable pointer plate mounting slot, left |
| | | | retractable pointer plate mounting slot, right |
| 184 | N/A | N/A | internal conductor groove |
| 186 | N/A | N/A | slide conductor groove |
| 188 | N/A | N/A | stabilizer ball access opening |
| 190 | N/A | N/A | retention spring chamber |
| 194 | N/A | N/A | internal conductor head chamber |
| 196 | N/A | N/A | stabilizer assembly chamber |
| 198 | N/A | N/A | stabilizer assembly mounting hole |
| 200 | N/A | N/A | tension screw chamber |
| 202 | N/A | N/A | retainer spring |
| 204 | N/A | N/A | internal conductor |
| 204A | N/A | N/A | internal conductor head |
| 205 | N/A | N/A | stationary conductor strips |
| 206 | N/A | N/A | tension adjustment screw |
| 208 | N/A | N/A | tension screw shaft |
| 210 | N/A | N/A | tension screw head |
| 212 | N/A | N/A | tension screw flange |
| 213 | N/A | N/A | stabilizer assembly |
| 214 | N/A | N/A | stabilizer assembly base |
| 216 | N/A | N/A | geared outer wall |
| 216A | N/A | N/A | threaded shaft |
| 217 | N/A | N/A | circular recess |
| 220 | N/A | N/A | tension spring |
| 221 | N/A | N/A | spring tabs |
| 222 | N/A | N/A | ball socket |
| 224 | N/A | N/A | socket recess |
| 226 | N/A | N/A | stabilizer ball |
| 230 | N/A | N/A | left support bar |
| 232 | N/A | N/A | right support bar |
| 233 | N/A | N/A | outer bar notch |
| 234 | N/A | N/A | inner bar notch |
| 236 | N/A | N/A | slide conductor bar |
| 238 | N/A | N/A | contact strips |

Following additional parts pertain to accessory devices

| 250 | Dust cover | same | N/A |
| 252 | perimeter wall | same | N/A |
| 254 | base plate | same | N/A |

TABLE 1-continued

Reference Numbers and Corresponding Part Names Used Drawings.

¹Part Name Used in Descriptions of the Three Embodiments

| ²Reference Number | Basic Embodiment | First Alternative Embodiment | Second Alternative Embodiment |
|---|---|---|---|
| 256 | access opening | same | N/A |
| 258 | mounting pegs | same | N/A |
| 260 | canopy | same | N/A |
| 262 | seams | same | N/A |
| 270 | Brake device | same | N/A |
| 272 | base plate | same | N/A |
| 274 | hinge | same | N/A |
| 276 | activation arm | same | N/A |
| 278 | shank | same | N/A |
| 279 | friction pad | same | N/A |
| 280 | Joystick device | same | N/A |
| 282 | base plate | same | N/A |
| 284 | hinge | same | N/A |
| 286 | activation plate | same | N/A |
| 287 | hole | same | N/A |
| 288 | notch | same | N/A |
| 290 | pen handle | same | N/A |
| 291 | mounting shaft | same | N/A |
| 292 | lock nut | same | N/A |
| 293 | threaded hole | same | N/A |
| 300 | Mouse-like knob | same | N/A |
| 302 | bottom plates | same | N/A |
| 304 | top cover | same | N/A |
| 306 | openings | same | N/A |
| 308 | clearance slots | same | N/A |
| 310 | side walls | same | N/A |
| 312 | clearance slots | same | N/A |
| 314 | remote select buttons | same | N/A |
| 316 | button mounts | same | N/A |
| 318 | activation plungers | same | N/A |
| 320 | pressure disks | same | N/A |
| 322 | mounting hole | same | N/A |
| 330 | Tracer attachment | same | N/A |
| 332 | base plate | same | N/A |
| 333 | access hole | same | N/A |
| 334 | hinge | same | N/A |
| 336 | boom mount | same | N/A |
| 337 | mounting slot | same | N/A |
| 338 | activator mounting hole | same | N/A |
| 339 | activator | same | N/A |
| 340 | knurled head | same | N/A |
| 341 | threaded shaft | same | N/A |
| 342 | locknut | same | N/A |
| 343 | threaded hole | same | N/A |
| 346 | boom | same | N/A |
| 348 | rib | same | N/A |
| 350 | operation head | same | N/A |
| 352 | stud | same | N/A |
| 351 | mounting slot | | |
| 354 | penholder | same | N/A |
| 355 | mounting hole | same | N/A |
| 356 | pen receptacle | same | N/A |
| 357 | semicircular notch | same | N/A |
| 358 | upper clip | same | N/A |
| 359 | release tab | same | N/A |
| 360 | middle clip | same | N/A |
| 361 | release tab | same | N/A |
| 362 | lower clip | same | N/A |
| 363 | release tab | same | N/A |

Footnotes:
¹The word "part" may refer to a physical part or other feature under consideration.
The word "same" is used for a corresponding part appearing in alternative embodiments which do not differ significantly in form nor function from that part in the basic embodiment.
The symbol "N/A" designates that the part under consideration is not applicable or differs significantly for that embodiment and may be listed as a separate part.
Parenthesized reference numbers in part name columns for any embodiments refer to parts which functions as the part under consideration. Other parenthesized notes in these columns indicate how the parts differ in form from corresponding parts for the basic embodiment.
Pluralized part names indicate that two or more parts of the same name and reference number appear in the embodiment.
²Part numbers and corresponding parts are generally grouped according to major assembly. Such groups are segregated by horizontal lines. Parts of a subassembly within a major assembly are separated by a blank line.
³Same as 81, but shown as 81A and 81B for illustration of 81B's function as an encoder operation rack in the first alternative embodiment.

I claim:

1. A manually operable signal generating device that generates signals suitable for controlling objects on a display device, said signal generating device comprising:

a base having a first axis, and having a second axis substantially perpendicular to said first axis;

a carriage mounted to said base;

a pointer mounted to said carriage;

a first ball bearing mounting means for guiding uniaxial movement of the carriage along the direction of the first axis and for inhibiting said carriage of movement that is perpendicular to said first axis;

a second ball bearing mounting means for guiding uniaxial movement of the pointer along the direction of the second axis and for inhibiting said pointer of movement relative to the carriage that is perpendicular to said second axis;

movement detection means for generating signals indicative of the direction and the magnitude of movement of the carriage along the first axis and for generating signals indicative of the direction and the magnitude of movement of the pointer along the second axis; and electrical circuitry coupling said movement detection means to a microprocessor that generates signals and sends said signals to said display device translated as commands.

2. The signal generating device of claim 1, wherein said first ball bearing mounting means comprises:

a plurality of ball bearing assemblies each having a plurality of ball bearings;

a plurality of support channels formed linearly on the base, being parallel to the first axis and having edges that are oriented in a first predetermined direction; and a plurality of guide channels formed linearly on the carriage, being parallel to the first axis and having edges that are oriented in a second predetermined direction facing said first direction;

the guide channels being aligned face to face to the support channels and being frictionally separated by the ball bearing assemblies;

the ball bearing being engaged in the support channels on one side of a centerline of said ball bearings and engaged in the guide channels on the opposite side of said centerline, such that the guide channels are confined to planar movement only along the longitudinal axes of the support channels and being substantially inhibited of any lateral play.

3. The signal generating device of claim 2 wherein said first predetermined direction is upward, said second predetermined direction is downward and said centerline is parallel to a plane defined by the first axis and the second axis.

4. The signal generating device of claim 2 wherein said first predetermined direction is inward, said second predetermined direction is outward and said centerline is perpendicular to a plane defined by said first axis and said second axis, such that said engagement inhibits the aligned channels of relative movement perpendicular to said plane.

5. The signal generating device of claim 2 wherein said first predetermined direction is outward, said second predetermined direction is inward and said centerline is perpendicular to a plane defined by said first axis and said second axis, such that said engagement inhibits the aligned channels of relative movement perpendicular to said plane.

6. The signal generating device of claim 1, wherein said second ball bearing mounting means comprises:

a plurality of ball bearing assemblies each having a plurality of ball bearings;

a plurality of support channels formed linearly on the carriage, being parallel to the second axis and having edges that are oriented in a first predetermined direction; and a plurality of guide channels formed linearly on the pointer, being parallel to said second axis and having edges that are oriented in a second predetermined direction facing said first direction;

the guide channels being aligned face to face to the support channels and being frictionally separated by the ball bearing assemblies;

the ball bearings being engaged in the support channels on one side of a centerline of said ball bearings and engaged in the guide channels on the opposite side of said centerline, such that said guide channels are confined to planar movement only along the longitudinal axes of said support channels and being substantially inhibited of any lateral play.

7. The signal generating device of claim 6 wherein said first predetermined direction is upward, said second predetermined direction is downward and said centerline is parallel to a plane defined by the first axis and the second axis.

8. The signal generating device of claim 6 wherein said first predetermined direction is inward, said second predetermined direction is outward and said centerline is perpendicular to a plane defined by said first axis and said second axis, such that said engagement inhibits the aligned channels of relative movement perpendicular to said plane.

9. The signal generating device of claim 6 wherein said first predetermined direction is outward, said second predetermined direction is inward and said centerline is perpendicular to a plane defined by said first axis and said second axis, such that said engagement inhibits the aligned channels of relative movement perpendicular to said plane.

10. The signal generating device of claim 1, further comprising upon the upper surface thereof, at least one recess into which ordinary writing instruments may be momentarily engaged, whereby said device can be fully operated indirectly therewith.

11. The signal generating device of claim 1, further comprising in said pointer a receptacle for firmly holding a pen or pencil substantially perpendicular to the plane of pointer movement, whereby said pointer may be moved indirectly therewith.

12. The signal generating device of claim 1, further comprising in said pointer a knob located therein, and means for extending and retracting said knob with respect to the upper surface of said pointer.

13. The signal generating device of claim 1, further comprising:

an operation plate mounted juxtaposition to said pointer; and means for lateral retractable extension of said operation plate to be positioned offset from a lateral boundary of said stationary base, whereby said device can be mounted concealed within equipment such as a computer keyboard and to be fully operated remotely by laterally extending said operation plate.

14. The signal generating device of claim 13, further comprising a stabilizing mechanism including:

a stabilizing ball positioned in said pointer and exposed above the upper surface thereof;

a tensioning means underneath said ball for urging said ball upward; and a stationary outer case having a plate that is parallel to said stationary base and positioned above the top surface of said pointer;

said stabilizing ball being urged against the underside of said top plate, whereby substantially firm contact is induced indirectly between said pointer and said stationary case.

15. The signal generating device of claim 14, further including means for adjusting the tension of said tensioning means.

16. A computer pointing device comprising:

a base having a first axis, and having a second axis substantially perpendicular to said first axis;

a carriage mounted to said base;

a pointer mounted to said carriage;

a first ball bearing mounting means for guiding uniaxial movement of said carriage along the direction of said first axis and for inhibiting said carriage of movement that is perpendicular to said first axis;

a second ball bearing mounting means for guiding uniaxial movement of said pointer along the direction of said second axis and for inhibiting said pointer of movement relative to said carriage that is perpendicular to said second axis;

movement detection means for generating signals indicating the direction and the magnitude of movement of said carriage along said first axis and the direction and the magnitude of movement of said pointer along said second axis;

at least one select button each coupled to a switch to cause the generation of select signals; and electrical circuitry to couple said movement detection means and each said switch to a microprocessor that generates signals and sends said signals to a computer translated as commands; wherein, said first ball bearing mounting means comprises:

a plurality of ball bearing assemblies each having a plurality of ball bearings spaced in sockets formed along a linear retainer;

a plurality of support channels composed on said base and oriented parallel to said first axis; and a plurality of guide channels composed on said carriage and oriented parallel to said first axis; and wherein said second ball bearing mounting means comprises:
a plurality of said ball bearing assemblies;
a plurality of support channels composed on said carriage and oriented parallel to said second axis; and
a plurality of guide channels composed on said pointer and oriented parallel to said second axis;

each said guide channel being aligned face to face with an adjacent said support channel, said aligned channels being frictionally separated by said ball bearing assemblies;

said ball bearings being engaged in the support channel on a first side of a centerline of said ball bearings and engaged in the adjacent guide channel on the opposite side of said centerline of said ball bearings.

17. The pointing device of claim 16, wherein said movement detection means comprises:

two rotary encoders, each having a rotatable operation shaft positioned perpendicular to each other and also perpendicular to one of each said axes; and two linear racks, each orientated perpendicular to the other such that each is parallel to one of each said axes, each fixed to a member having relative movement perpendicular to the rotational axis of one of said shafts and being in frictional contact with said shaft, whereby each said shaft is rotated by the respective said rack in response to said relative movement.

18. A computer pointing device comprising:

a base having a first axis, and having a second axis substantially perpendicular to said first axis;

a housing mounted on said base;

a pointer mounted on said housing;

a first ball bearing mounting means for guiding uniaxial movement of said housing along the direction of said first axis and for inhibiting said housing of movement that is perpendicular to said first axis;

a second ball bearing mounting means for guiding uniaxial movement of said pointer along the direction of said second axis and for inhibiting said pointer of movement relative to said housing that is perpendicular to said second axis;

movement detection means for generating signals indicating the direction and the magnitude of movement of said housing along said first axis and the direction and the magnitude of movement of said pointer along said second axis;

at least one select button each coupled to a switch to cause the generation of select signals; and electrical circuitry to couple said movement detection means and each said switch to a microprocessor that generates signals and sends said signals to a computer translated as commands; wherein said first ball bearing mounting means comprises:
a plurality of ball bearing assemblies each having a plurality of ball bearings spaced in sockets formed along a linear retainer sleeve of predetermined length and cross sectional shape;
a plurality of support channels composed on an upper section of said base and oriented parallel to said first axis; and
a plurality of guide channels composed on a lower section of said housing and oriented parallel to said first axis; and wherein said second ball bearing mounting means comprises:
a plurality of said ball bearing assemblies;
a plurality of support channels composed on an upper section of said housing and oriented parallel to said second axis; and
a plurality of guide channels composed on a lower section of said pointer and oriented parallel to said second axis;

each said guide channel being aligned face to face with an adjacent support channel, said aligned channels being frictionally separated by said ball bearing assemblies;

said ball bearings being engaged in the support channel on a first side of a centerline of said ball bearings and engaged in the adjacent guide channel on the opposite side of said centerline of said ball bearings.

19. The pointing device of claim 18, wherein said movement detection means comprises:

two rotary encoders, each having a rotatable operation shaft positioned perpendicular to each other and also perpendicular to one of each said axes; and two linear racks, each orientated perpendicular to the other such that each is parallel to one of each said axes, each fixed to a member having relative movement perpendicular to the rotational axis of one of said shafts and being in frictional contact with said shaft, whereby each said shaft is rotated by the respective said rack in response to said relative movement.

* * * * *